(12) United States Patent
Sawada

(10) Patent No.: US 7,213,484 B2
(45) Date of Patent: May 8, 2007

(54) STEERING COLUMN APPARATUS

(75) Inventor: Naoki Sawada, Maebashi (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 616 days.

(21) Appl. No.: 10/775,478

(22) Filed: Feb. 10, 2004

(65) Prior Publication Data
US 2004/0159173 A1 Aug. 19, 2004

(30) Foreign Application Priority Data

Feb. 14, 2003 (JP) ............... 2003-035938
Nov. 25, 2003 (JP) ............... 2003-393910

(51) Int. Cl.
B62D 1/18 (2006.01)
(52) U.S. Cl. ..................... 74/493; 280/775
(58) Field of Classification Search ............... 74/492, 74/493; 280/775, 776, 777
See application file for complete search history.

(56) References Cited

U.S. PATENT DOCUMENTS

| 5,269,562 | A | 12/1993 | Peitsmeier et al. ......... 280/775 |
| 5,363,716 | A * | 11/1994 | Budzik et al. ............... 74/493 |
| 5,820,163 | A * | 10/1998 | Thacker et al. ............ 280/775 |
| 6,035,739 | A | 3/2000 | Milton ....................... 74/493 |
| 6,279,414 | B1 | 8/2001 | Moon ......................... 74/493 |
| 6,467,367 | B2 | 10/2002 | Kim et al. ................... 74/493 |
| 7,021,660 | B2 * | 4/2006 | D'Agostino et al. ........ 280/775 |

FOREIGN PATENT DOCUMENTS

GB 2 281 375 A 3/1995

* cited by examiner

Primary Examiner—David M. Fenstermacher
(74) Attorney, Agent, or Firm—Sidley Austin LLP

(57) ABSTRACT

Disclosed here is a steering column apparatus that enables a single operation lever provided apart from the steering wheel and to be used for clamping/unclamping each of the telescopic mechanism and the tilting mechanism independently, as well as for keeping at least one of the telescopic mechanism and the tilting mechanism unclamped after it is unclamped even after the driver takes his/her hand off the operation lever. This makes it possible for the driver to use both hands to adjust at least either the position in the front-rear direction or tilting angle of the steering wheel.

16 Claims, 27 Drawing Sheets a b1 b1 b2 b3 b4

STEERING COLUMN APPARATUS

This application is based on application Nos. 2003-035938 and 2003-393910 filed in Japan, the contents of which are hereby incorporated by reference.

BACKGROUND OF THE INVENTION

1. Field of the Invention

The present invention relates to a steering column apparatus, more particularly to a steering column apparatus to be employed for a vehicle provided with a telescopic mechanism and a tilting mechanism.

2. Description of Related Art

Both of the telescopic mechanism and the tilting mechanism are used to adjust the position in the front-rear direction and the tilting angle of the steering wheel of a subject car appropriately to the figure and comfort of the driver, thereby making it easier for the driver to drive the car.

Each of the telescopic mechanism and the tilting mechanism is provided with a clamp/unclamp mechanism so as to adjust the position in the front-rear direction and the tilting angle of the steering wheel as described above. When in such an adjustment, the clamp/unclamp mechanisms of the telescopic mechanism and the tilting mechanism are unclamped once to adjust the front-rear direction/tilting angle in that state, then the mechanisms are clamped again after completing the adjustment.

The telescopic mechanism is processed and built in the subject steering column apparatus accurately enough so that when it is to be clamped/unclamped, it receives a proper pre-load and is fit properly in the device, thereby preventing its moving parts from excessive play. Consequently, the telescopic mechanism comes to need an operation force larger than that of the tilting mechanism. The driver is thus required to use both of his/her hands to operate the steering wheel to adjust the position of the steering wheel in the front-rear direction. This has been a problem of the conventional technique. The published GB patent No.2281375 discloses a steering column apparatus provided with a single operation handle that can be operated by the driver with his/her hand on the steering wheel.

In the steering column apparatus disclosed by the above published GB patent No.2281375, the operation handle is usually kept pulled by a pulling spring so that the operation handle stays at its refuge position that is apart from the steering wheel. The driver is thus prevented from touching the operation handle by accident while driving the car. When adjusting the steering wheel, the operation handle is pulled toward the steering wheel resisting the force of the pulling spring. This movement of the operation handle is transmitted to the clamp device provided apart from the operation handle and used for adjusting the steering wheel in the front-rear direction through a cable movable in a flexible tube, thereby the clamp device is unclamped. And, this movement of the operation handle unclamps the clamp device provided near the operation handle and used for adjusting the tilting angle of the steering wheel. After completing the adjustments of the position in the front-rear direction and the tilting angle of the steering wheel by operating the steering wheel with both hands while putting his/her fingers on the operation handle, if the driver takes the fingers off the operation handle, the operation handle is pulled by the pulling spring to return to the refuge position, then both of the clamp devices for adjusting the position in the front-rear direction and the tilting angle of the steering angle are clamped.

The steering column apparatus disclosed by the above published GB patent needs a mechanism for moving the operation handle between the refuge position and a position at the steering wheel side, as well as a complicated mechanism for keeping the operation handle at the refuge position. In addition, both cable and its tube are flexible enough to be able to minimize the curvature so that the cable/tube can be moved freely in the entire adjustment range of the steering wheel. Consequently, part of the cable/tube is protruded from the steering column apparatus. This is not only unbecoming, but also might cause troubles. This is why the transmission mechanism having such cable and tube comes to injure the device reliability. And, the flexible cable seems to degrade the operability of the steering column apparatus itself, as well.

The mechanisms for adjusting the position in the front-rear direction and the tilting angle of the steering wheel are used not only when in driving, but also when getting in/out of the car. This is to make it easier for the driver to get in/out of the car; the driver just moves the steering wheel to its refuge position at that time. If the steering wheel is to be moved to its refuge position only to get in/out of the car such way, what the driver needs to do at that time is just push the steering wheel to the other side using the tilting mechanism. In the steering column apparatus disclosed by the above published GB patent, however, both of the tilting mechanism and the telescopic mechanism must be unclamped together by an operation of the operation handle when in an adjustment of the position of the steering wheel as described above. Consequently, the driver must put out his/her strength to operate the operation handle. In addition, the unclamped telescopic mechanism moves easily. If it moves, it must be adjusted again before starting another drive.

SUMMARY OF THE INVENTION

Under such circumstances, it is an object of the present invention to provide a steering column apparatus that enables a single operation lever provided apart from the steering wheel to be used for operating the clamp/unclamp mechanisms of both of a telescopic mechanism and a tilting mechanism built therein, as well as to keep at least one of the telescopic mechanism and the tilting mechanism unclamped even when the driver takes his/her hand off the operation lever after at least one of the telescopic mechanism and the tilting mechanism is unclamped, thereby enabling the driver to use both of his/her hands to adjust at least either of the position in the front-rear direction or tilting angle of the steering wheel.

Furthermore, it is another object of the present invention to provide a steering column apparatus that enables the single operation lever to be operated only for the clamp/unclamp mechanism of either of the telescopic mechanism or tilting mechanism independently, thereby enabling the driver to adjust either of the telescopic mechanism or tilting mechanism as needed and minimize the strength for operating the operation lever.

The above objects of the present invention are to be achieved by the following inventions. Concretely, the first invention to achieve the above objects is a steering column apparatus, comprising: a wheel shaft for transmitting the rotation from a steering wheel to a steering mechanism of a car body; a telescopic mechanism for adjusting the position of the steering wheel in the front-rear direction of the car body; a tilting mechanism for adjusting the tilting angle of the steering wheel; a clamping mechanisms for clamping the telescopic mechanism and the tilting mechanism respectively; a single operation lever with an end apart from the steering wheel for a driver to operate the clamping mechanisms; and an unclamp keeping mechanism which keeps at least one of the clamping mechanisms in unclamping state for steering wheel adjustment after the first operation is applied to the lever until the second operation is applied thereto.

The second invention to achieve the above objects is a steering column apparatus, comprising: a wheel shaft for transmitting the rotation from a steering wheel to a steering mechanism of a car body; a telescopic mechanism for adjusting the position of the steering wheel in the front-rear direction of the car body; a tilting mechanism for adjusting the tilting angle of the steering wheel; clamping mechanisms for clamping the telescopic mechanism and the tilting mechanism; an operation lever with an end apart from the steering wheel for a driver to operate the clamping mechanisms; and an unclamp keeping mechanism which keeps the clamping mechanism of the telescopic mechanism in unclamping state for steering wheel adjustment after the first operation is applied to the lever until the second operation is applied thereto.

The third invention to achieve the above objects is a steering column apparatus, comprising: a wheel shaft for transmitting the rotation from a steering wheel to a steering mechanism of a car body; a telescopic mechanism for adjusting the position of the steering wheel in the front-rear direction of the car body; a tilting mechanism for adjusting the tilting angle of the steering wheel; clamping mechanisms for clamping the telescopic mechanism and the tilting mechanism; an operation lever with an end apart from the steering wheel for a driver to operate the clamping mechanisms; and an unclamp keeping mechanism which keeps the clamping mechanism of the tilting mechanism in unclamping state for steering wheel adjustment after the first operation is applied to the lever until the second operation is applied thereto.

The fourth invention to achieve the above objects is a variation of the steering column apparatus of the first invention, wherein the tilting mechanism and the telescopic mechanism are unclamped by operations in different directions of the lever.

The fifth invention to achieve the above objects is a variation of the steering column apparatus of the first invention, wherein both of the tilting mechanism and the telescopic mechanism are unclamped at the same time when the operation lever is operated.

The sixth invention to achieve the above objects is steering column apparatus, comprising: a first column member having a mounting part for mounting itself to a car body; a second column member supported by the first column member unrotatably and movably along the longitudinal direction; a column head provided at one end of the second column member; a tilt head tiltably supported by the column head; a wheel shaft rotatably supported by the tilt head for fixing a steering wheel at its end; a column clamp for clamping the second column member to the first column member; a clamp lever having a first rocking axis on the tilt head; a tilt head clamp for clamping the tilt head to the column head correlatively to the rocking of the clamp lever; a single operation lever supported by the clamp lever rockably around a second rocking axis and having an end apart from the steering wheel; and an unclamp keeping mechanism which keeps the clamping mechanisms in unclamping state for steering wheel adjustment after the first operation is applied to the operation lever until the second operation is applied thereto, wherein the tilt head is unclamped by rocking of the clamp lever around the first rocking axis on the tilt head caused by operation of the operation lever in one direction and the second column member is unclamped by rocking of the operation lever around the second rocking axis on the clamp lever in the opposite direction.

The seventh invention to achieve the above objects is a variation of the steering column apparatus of the sixth invention, wherein the unclamp keeping mechanism includes: a pusher plate with which the operation lever provides; a guide fixed to the column head; a pusher, one end of which is put in contact with the pusher plate, being slidable in parallel to tilting axis of the tilt head under the guidance of the guide; and a shifter being slidable in parallel to the tilting axis when coming in contact with the other end of the pusher under the guidance of the guide; whereby the opposite directional rocking motion of the operation lever is converted to rocking motion of the pusher plate, to liner motion of the pusher, to liner motion of the shifter for clamping/unclamping of the second column and to rotation of the same guided by inclined plate of the guide for keeping the clamping/unclamping state.

The eighth invention to achieve the above objects is a variation of the steering column apparatus of the seventh invention, wherein the unclamp keeping mechanism further includes: a rod with ends, one end of which being in contact with the shifter and the other engaging with the column clamp, supported by the column head slidably and co-axially to the shifter; and a first spring biasing the rod to the shifter for clamping the second column and keeping in contact with the shifter.

The ninth invention to achieve the above objects is a variation of the steering column apparatus of the eighth invention, wherein the tilt head is provided with a second spring biasing the clamp lever for clamping.

The tenth invention to achieve the above objects is a variation of the steering column apparatus of the ninth invention, wherein the unclamp keeping mechanism is released from unclamping state of by second operation of the operation lever.

The eleventh invention to achieve the above objects is a steering column apparatus, comprising: a first column member having a mounting part for mounting itself to a car body; a second column member supported by the first column member unrotatably and movably along the longitudinal direction; a column head provided at one end of the second column member; a tilt head tiltably supported by the column head; a wheel shaft rotatably supported by the tilt head for fixing a steering wheel at its end; a column clamp for clamping the second column member to the first column member; a tilt head clamp for clamping the tilt head to the column head; a single operation lever with an end apart from the steering wheel supported rockably by the tilt head for operating both of the column clamp and the tilt head clamp; and an unclamp keeping mechanism which keeps the clamping mechanisms for both of the second column and the tilt head in unclamping state for steering wheel adjustment after the first operation is applied to the operation lever until the second operation is applied thereto.

The twelfth invention to achieve the above objects is a variation of the steering column apparatus of the eleventh invention, wherein the clamp keeping mechanism includes a rocking arm and a rocking cam; wherein the rocking arm is provided at the operation lever and capable of coming in contact with one end of the rocking cam; wherein the rocking cam is supported at the tilt head rockably; and wherein rocking of the operation lever, when the lever is rocked in one direction, is converted to rocking of the rocking arm and rocking of the rocking cam in order and, when both of the column clamp and the tilt head clamp are unclamped, the rocking arm is engaged with the rocking cam, thereby keeping both of the column clamp and the tilt head clamp in that state.

The thirteenth invention to achieve the above objects is a variation of steering column apparatus of the twelfth invention, wherein the unclamp keeping mechanism further includes a first spring; and wherein the first spring biases the rocking cam so as to keep it in contact with the rocking arm.

The fourteenth invention to achieve the above objects is a variation of the steering column apparatus of the thirteenth invention, wherein the tilt head is provided with a second spring for biasing the operation lever for tilt head clamping.

The fifteenth invention to achieve the above objects is a variation of the steering column apparatus of the fourteenth invention, wherein the unclamp keeping mechanism are released from unclamping state by operation of the operation lever in one direction.

The sixteenth invention to achieve the above objects is steering column apparatus, comprising: a wheel shaft for transmitting the rotation from a steering wheel to a steering mechanism of a car body; a adjusting mechanism for adjusting the position of the steering wheel; a clamp mechanism for clamping the adjusting mechanism; an operation lever with an end apart from the steering wheel for operating the clamp mechanism; and an unclamp keeping mechanism which keeps the clamping mechanism in unclamping state for steering wheel adjustment after the first operation is applied to the lever until the second operation is applied thereto.

As described above, the steering column apparatus of the present invention has a single operation lever positioned apart from the steering wheel and usable for operating clamp/unclamp mechanisms of both of the telescopic mechanism and the tilting mechanism. In addition, even after the driver takes his/her hand off the operation lever, at least one of the clamp/unclamp mechanisms for the telescopic mechanism and the tilting mechanism that is clamped/unclamped is kept in that state, so that the driver can adjust the steering wheel with both hands easily.

Furthermore, the steering column apparatus of the present invention can use the single operation lever positioned apart from the steering wheel to operate the clamp/unclamp mechanism of either the telescopic mechanism or tilting mechanism selectively and independently, thereby the driver can adjust each of the telescopic mechanism and the tilting mechanism independently. As a result, the steering column apparatus can be used under a variety of environmental conditions and the operation lever can be operated with a small power, so that the device can reduce the load of powerless drivers.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and together with the description, serve to explain the principles of the invention:

FIG. 26(2) is an illustration for describing the operation of an unclamp keeping mechanism 8 in the second embodiment of the present invention;

FIG. 26(3) is an illustration for describing the operation of an unclamp keeping mechanism 8 in the second embodiment of the present invention;

FIG. 26(4) is an illustration for describing the operation of an unclamp keeping mechanism 8 in the second embodiment of the present invention;

FIG. 26(5) is an illustration for describing the operation of an unclamp keeping mechanism 8 in the second embodiment of the present invention;

FIG. 26(6) is an illustration for describing the operation of an unclamp keeping mechanism 8 in the second embodiment of the present invention;

FIG. 26(7) is an illustration for describing the operation of an unclamp keeping mechanism 8 in the second embodiment of the present invention.

DETAILED DESCRIPTION OF THE PREFERRED EMBODIMENTS

Hereunder, the preferred embodiments of the present invention will be described with reference to the accompanying drawings.

First Embodiment

* General Description

Figure 1:
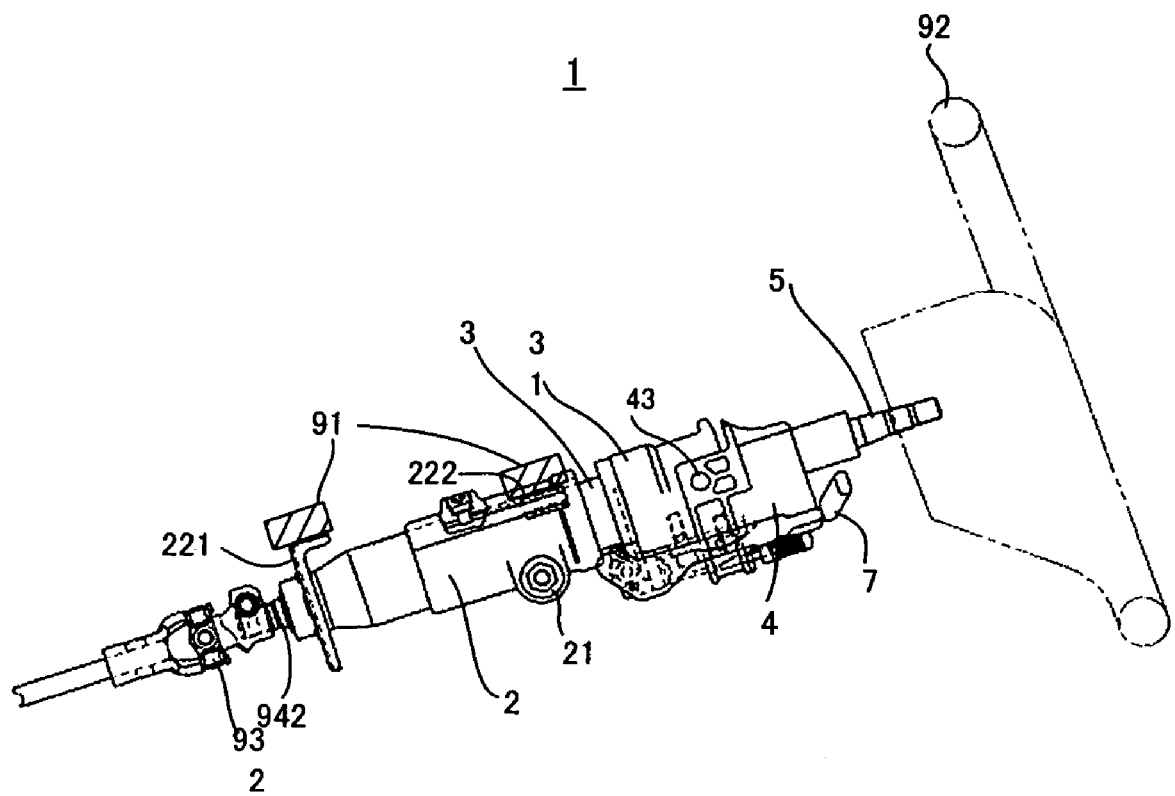
FIG. 1 is an external view of a steering column apparatus 1 in the first embodiment of the present invention.

FIGS. 1 through 15 show a steering column apparatus in the first embodiment of the present invention respectively. In this first embodiment, a single operation lever is operated for the clamp/unclamp mechanism of each of a telescopic mechanism and a tilting mechanism selectively and independently, so that the telescopic mechanism that is unclamped is kept in that state even after the driver takes his/her hand off the operation lever. FIG. 1 shows an external view of the steering column apparatus 1 in the first embodiment of the present invention. The steering column apparatus 1 includes a fixed column member 2, a moving column member 3, a column head 31, a tilt head 4, a wheel shaft 5, a column clamp 21, a tilt head clamp 41 (FIG. 2), and the operation lever 7.

The fixed column member 2 includes car body mounting parts 221 and 222. The fixed column part 2 is attached to the vehicle body with these body mounting parts 221 and 222. The fixed column member 2 supports a moving column member 3 unrotatably around the center shaft and movably toward the center shaft. The column head 31 is provided at one end of the moving column member 3. This column head 31 supports a tilt head 4 tiltably around the center shaft 43. The tilt head 4 supports a wheel shaft 5 rotatably and a steering wheel 92 is fixed at one end of the tilt head 4.

A column clamp shaft 6 (FIG. 3) is provided at the column head 31 rotatably around a shaft in parallel to the center shaft of the moving column member 3. A column clamp 21 is provided at the fixed column member 2. This column clamp 21 can move relatively to the column clamp shaft 6. According to the rotation of this column shaft 6, the moving column member 3 is clamped/unclamped.

The column head 31 is provided with a tilt head clamp 41, which clamps/unclamps the tilt head 4 to/from the column head 31. The tilt head 4 supports a single operation lever 7. The grip of this operation lever 7 is disposed apart from the steering wheel 92. Consequently, the driver is prevented from touching the operation lever by accident while operating the steering wheel 92 during a drive, thereby the moving column member 3 or tilt head 4 is prevented from being unclamped unexpectedly. In addition, such a disposition of the operation lever 7 also makes it easier for the driver to operate the switches disposed around the steering wheel 92.

If the operation lever 7 rocks to be separated from the steering wheel 92, the column clamp shaft 6 rotates and this rotation is transmitted to the column clamp 21 to clamp/unclamp the moving column member 3. If the operation lever 7 rocks to get closer to the steering wheel 92, the tilt head 4 is clamped/unclamped.

One end of the wheel shaft 5 is connected to a universal joint (not shown) in the steering column apparatus 1 and further to a mechanism for operating the direction of the front wheels through a pair of upper middle shafts (not shown) spline-connected to each other (not shown) a lower middle shaft 942, and a lower universal point 932.

* Tilt Head Clamp *

Figure 2:
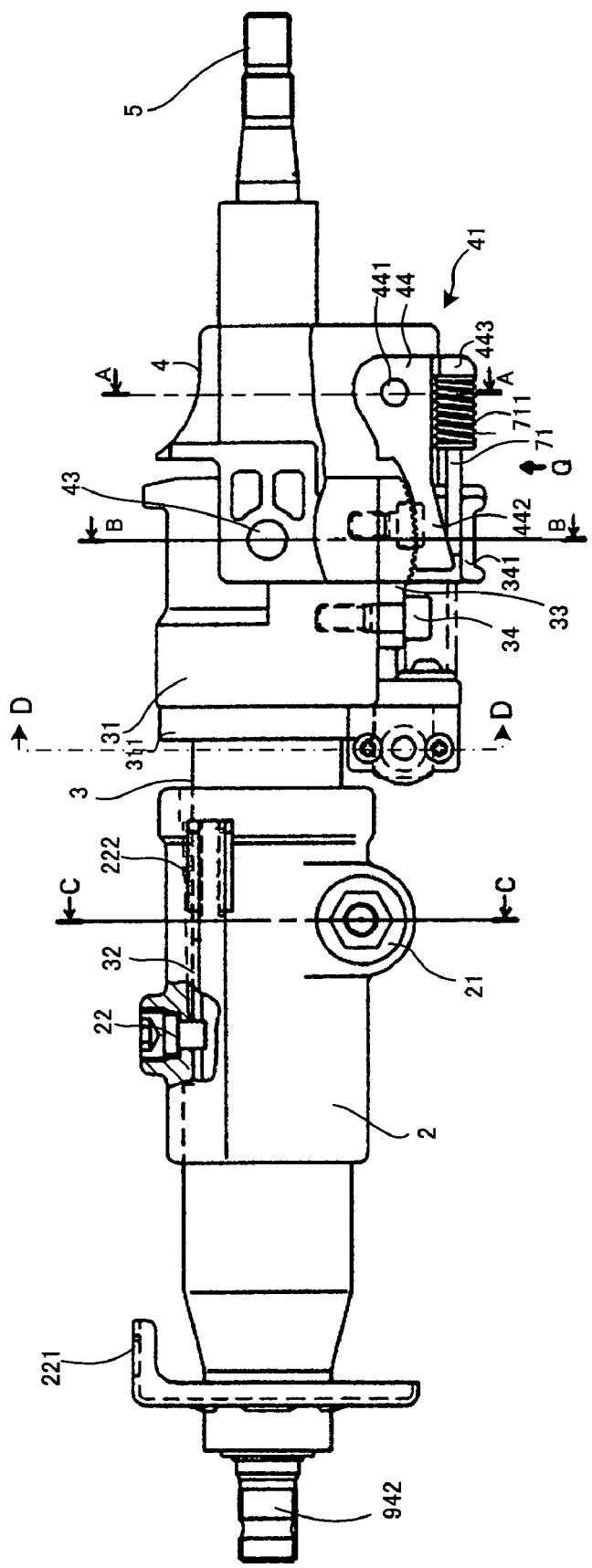
FIG. 2 is an enlarged view of a major portion of the steering column apparatus.
Figure 3:
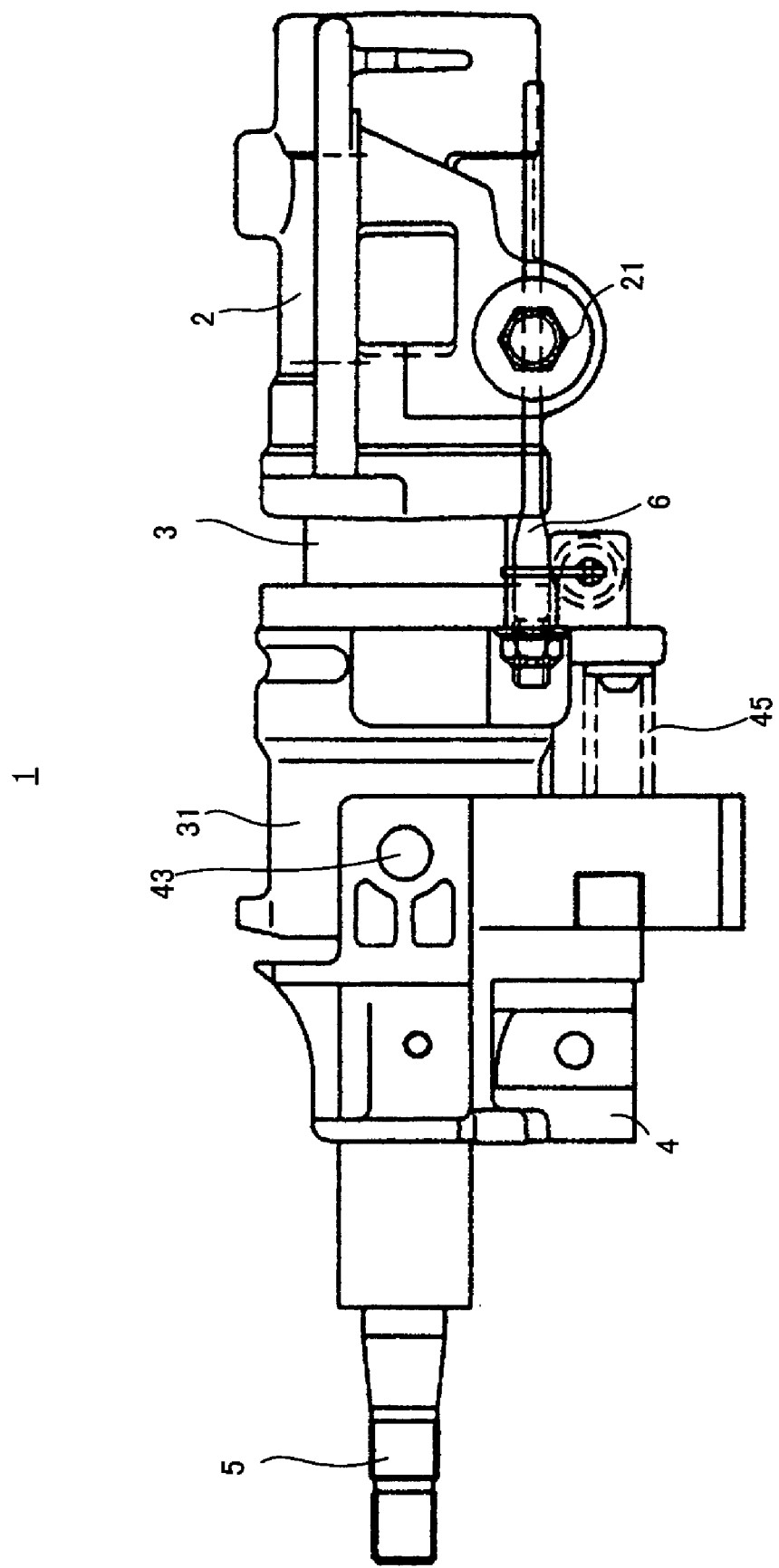
FIG. 3 is a rear view of the steering column apparatus shown in FIG. 2.
Figure 4:
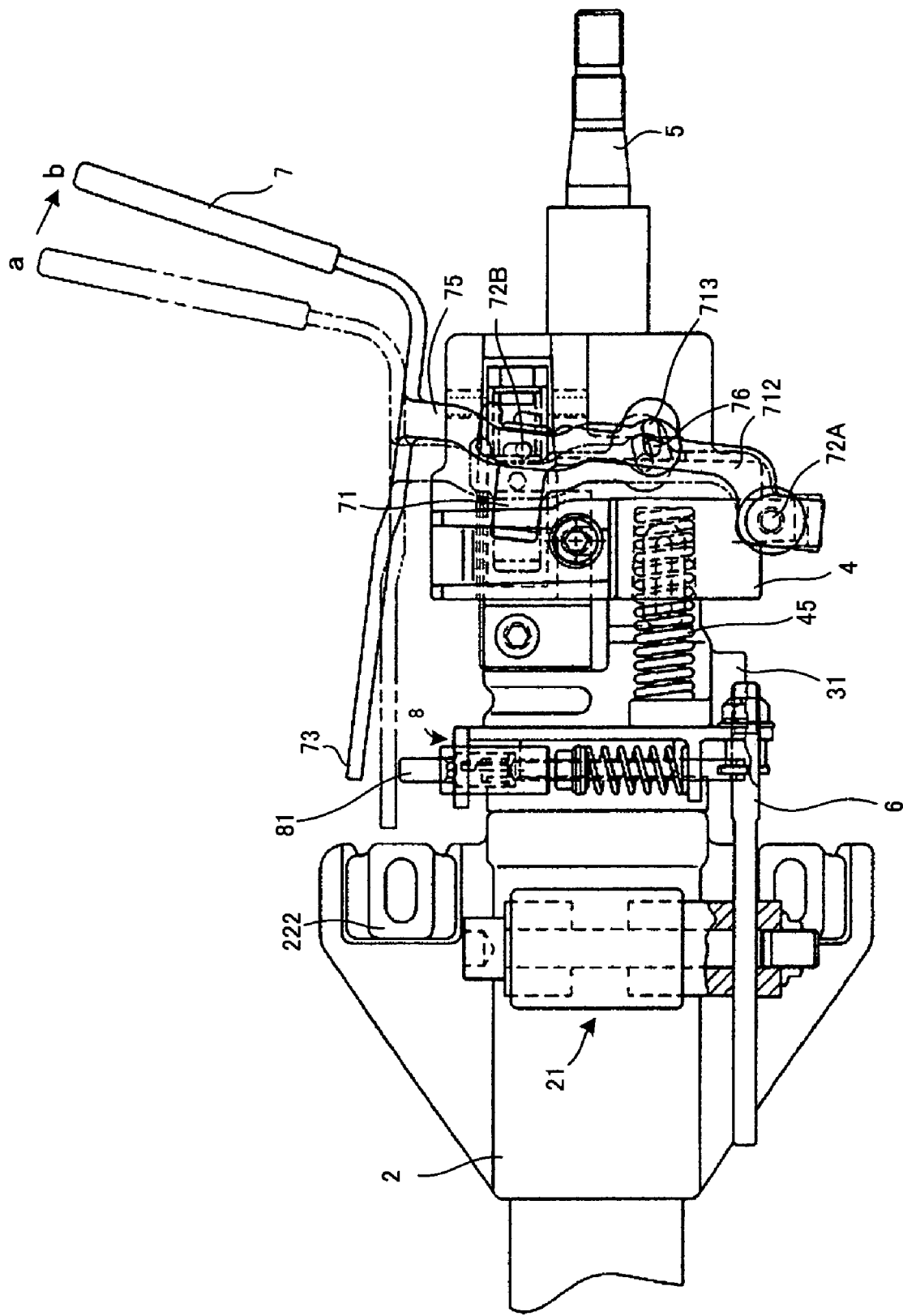
FIG. 4 is a bottom view (from the direction Q) of an operation lever 7 operated to unclamp a tilting mechanism.
Figure 5:
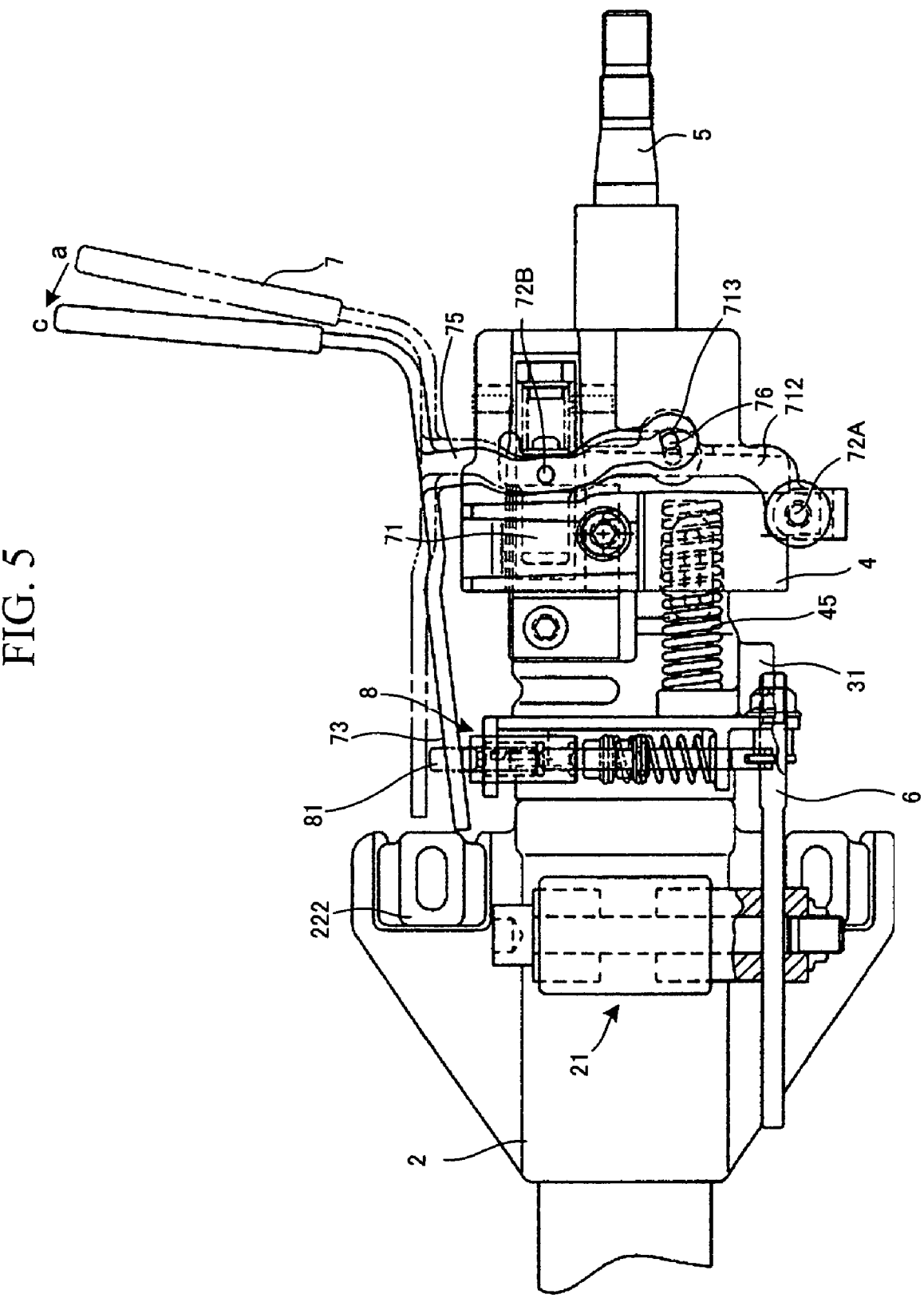
FIG. 5 is a bottom view (from the direction Q) of the operation lever 7 operated to unclamp a telescopic mechanism in FIG. 2.
Figure 6:
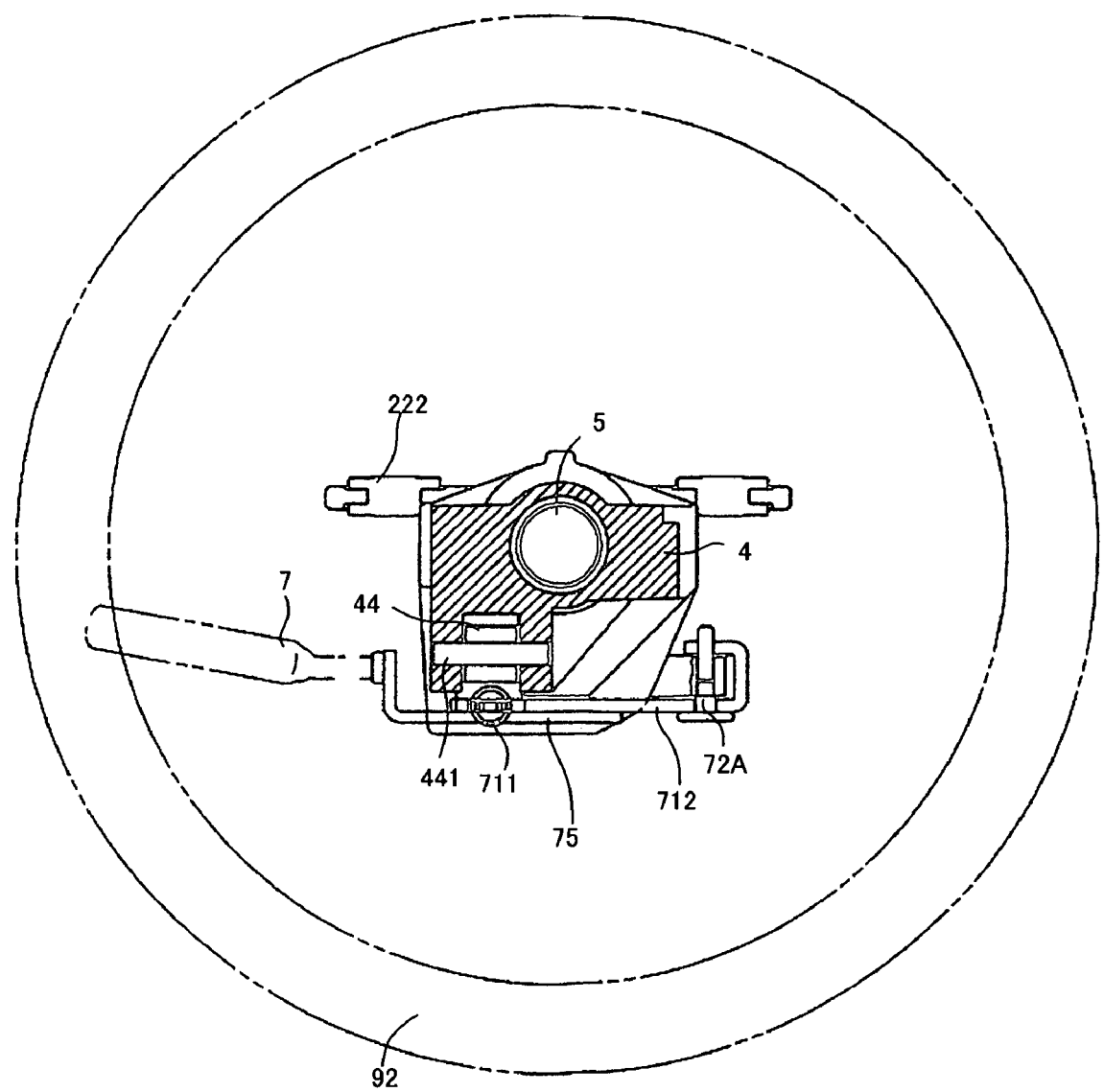
FIG. 6 is an A—A cross sectional view of FIG. 2.
Figure 7:
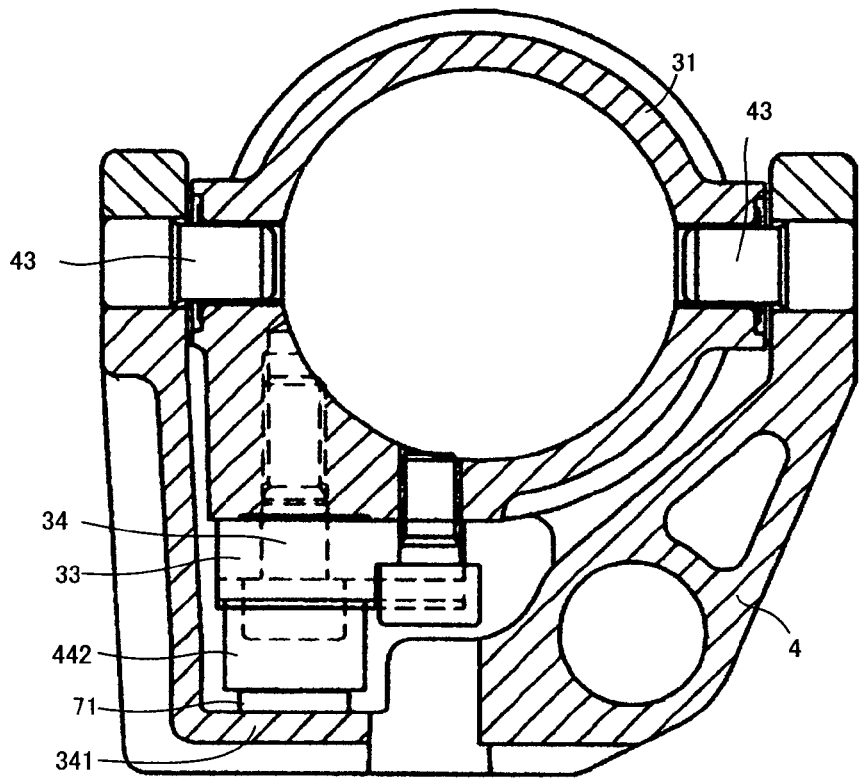
FIG. 7 is a B—B cross section view of FIG. 2.
Figure 8:
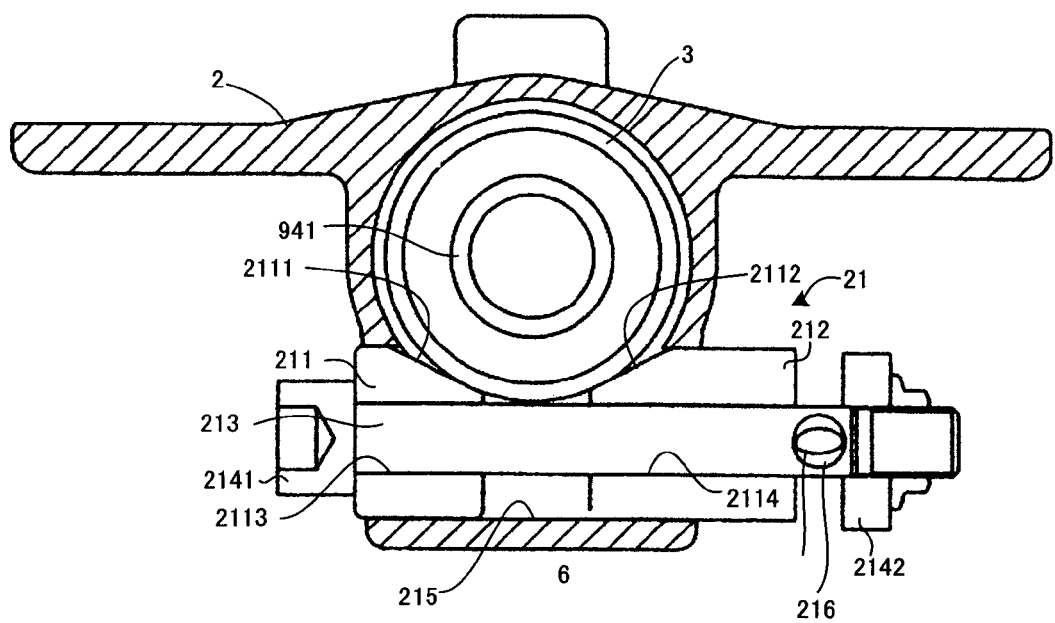
FIG. 8 is a C—C cross sectional view of FIG. 2.

FIG. 2 shows an enlarged view of a major portion of the steering column apparatus shown in FIG. 1. FIG. 3 is a rear view of FIG. 2. FIGS. 4 and 5 show bottom views (from the Q direction) of the steering column apparatus 1 shown in FIG. 2. The two-dot chain line denotes a state in which the operation lever is not pulled yet toward the steering wheel 92 and the solid line denotes a state in which the operation lever 7 is pulled toward the steering wheel 92. The two-dot line in FIG. 5 shows a state in which the operation lever is not pushed yet to be separated from the steering wheel 92 and the solid line shows a state in which the operation lever is pushed to be separated from the steering wheel 92. FIGS. 6 through 8 show A—A, B—B, and C—C cross sectional views of FIG. 2.

The tilt head clamp 41 is configured as follows. A segment gear 33 that is centered on the tilt center shaft 43 is fixed to the column head 31 by a bolt 34 and a back rest member 341 is provided between the column head 31 and the segment gear 33 with a space therebetween. On the other hand, in the space are disposed a gear part 442 of a gear arm 44 supported by the tilt head 4 rotatably around a shaft 441, as well as a projection 71. A lever center shaft 72A is attached to the tilt head 4 and a clamp lever 712 (FIGS. 4, 5, and 6) that rocks around this lever center shaft 72A is formed unitarily with the projection 71. The projection 71 and the clamp lever 712 are formed in an L-letter shape as a whole.

The gear arm 44 is shaped like an L-letter (FIG. 2) consisting of two legs. The gear part 442 is formed at one of the legs. An energizing spring 711 is provided between the other leg of the gear arm 44 and the rear part of the projection 71 to give a bias to widen the space between the rear part of the projection 71 and the leg 443.

This bias pushes the projection 71 to the left (FIG. 2), thereby the gear part 442 is pushed from the back. Then, the gear part 442 is pushed against the segment gear 33, so that their teeth are engaged. When the gear part 442 pushes the segment gear 33, the back rest member 341 comes to receive the reaction force applied to the projection 71 (FIGS. 2 and 7). Consequently, the tilt head 4 is fixed at the column head 31. The tilt head 4 is fixed step by step at each angle position where the gear part 442 and the segment gear 33 are engaged. When the projection 71 moves to the right in FIG. 2(FIGS. 2 and 4), the gear arm 44 pushed by the energizing spring 711 rotates counterclockwise in FIG. 2. The gear arm 44 is thus disengaged from the segment gear 33, thereby the tilt head clamp 41 is unclamped.

* Universal Joint and Middle Shaft

As described above, an upper universal joint is formed between an end of the upper middle shaft and an end of the wheel shaft 5. And, because the center of the universal joint is on the axis line of the center shaft 43, the universal joint is never affected by tilting of the tilt head 4.

The lower middle shaft 942 is supported by the fixed column member 2 rotatably and the lower middle shaft 942 and the upper middle shaft are spline-connected with each other. The moving column member 3 is thus movable in any of the right and left directions as shown in FIG. 1. The rotation of the upper middle shaft is transmitted to the lower middle shaft 942 regardless of where the moving column member 3 moves to, since the lower middle shaft 942 and the upper middle shaft are spline-connected to each other. Consequently, the position of the steering wheel 92 in the front-rear direction is adjusted and the rotation of the steering wheel 92 is transmitted to the lower middle shaft 942.

* Fixed Column Member and Moving Column Member *

As shown in FIG. 2, the cylindrical part of the moving column member 3 has a long hole 32 formed in its axial direction. A stopper member 22 provided at the fixed column member 2 is fit in this ling hole 32. The moving column member 3 is thus prevented by both of the long hole 32 and the stopper member 22 from coming off/rotating with respect to the fixed column member 2. The moving column member 3 is thus allowed to move in the fixed column member 2 in the axial direction within the range of the long hole 32. A cushion stopper 311 provided at an end face of the column head 31 prevents a strong collision of both metals of the column head 31 and the fixed column member 2 when the column head 31 hits against the end face of the fixed column member 2 during an adjustment. The cushion stopper 311 is made of synthesized resin or the like.

* Column Clamp *

Figure 9:
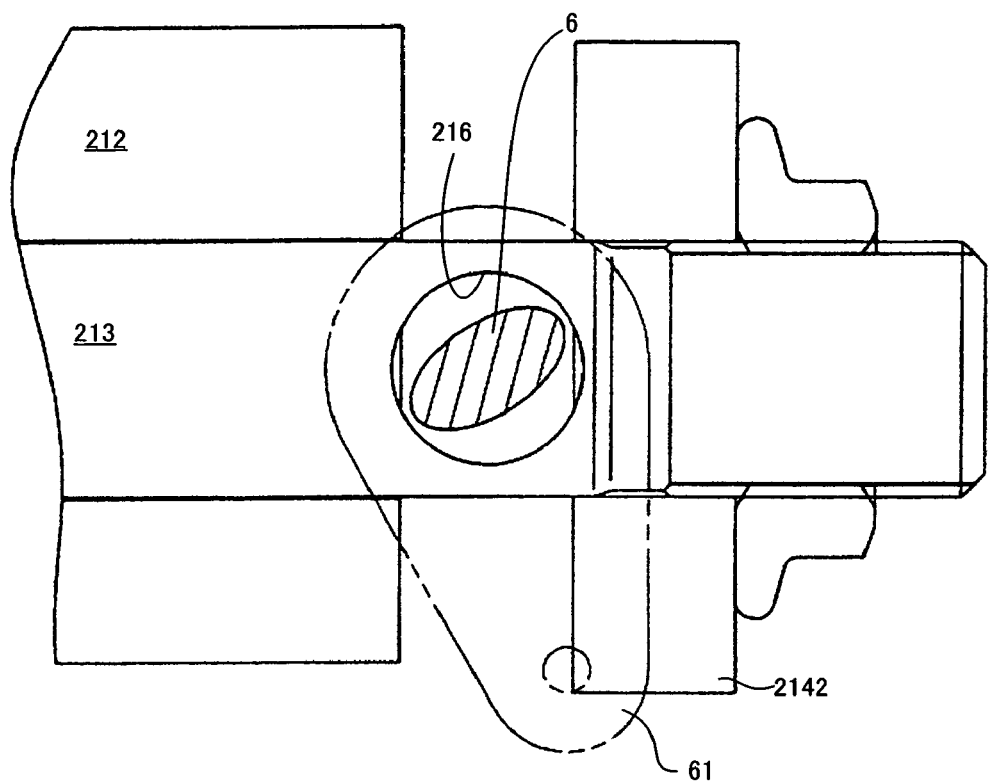
FIG. 9 is an enlarged view of part of FIG. 8, denoting a position to which a column clamp shaft 6 is rotated.
Figure 10:
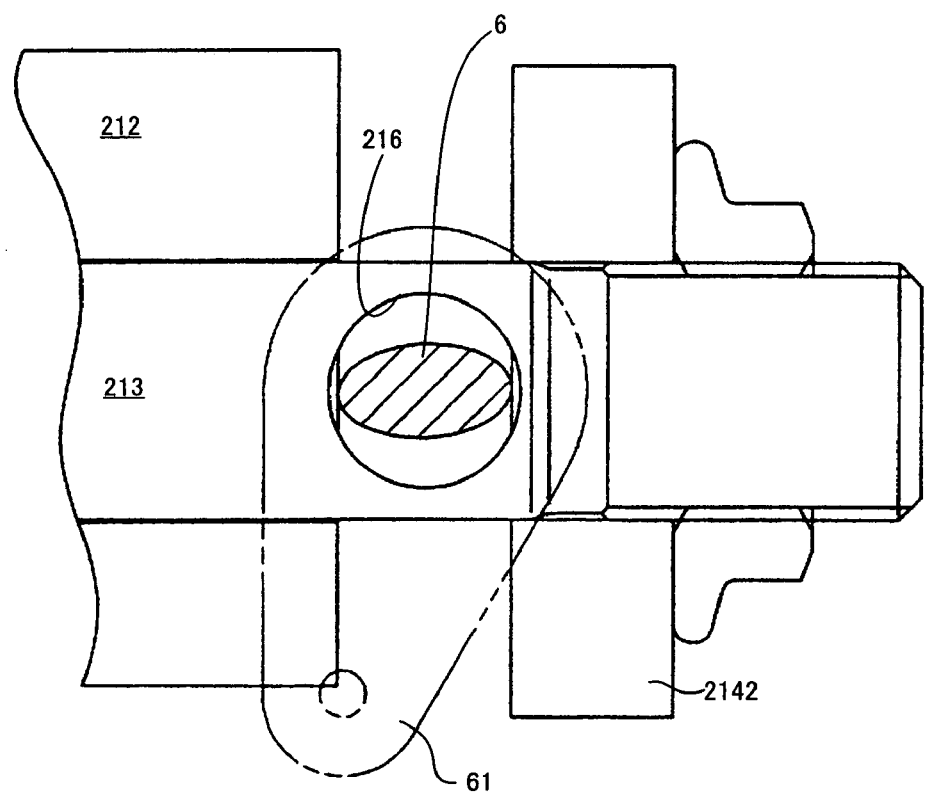
FIG. 10 is an enlarged view of part of FIG. 8, denoting a position to which a column clamp shaft 6 is rotated and clamped.

The column clamp 21 is configured as shown in FIGS. 8 through 10. FIG. 8 shows a C—C cross sectional view of the column clamp shown in FIG. 2 and FIGS. 9 and 10 are enlarged views of part of the column clamp shown in FIG. 8 respectively for denoting positions of the column clamp 6 that is rotating while it is clamped/unclamped. The column clamp 21 is provided at the fixed column member 2 and configured by a first wedge 211, a second wedge 212, a clamp bar 213, and reaction members 2141 and 2412. The fixed column member 2 has a wedge hole 215 drilled horizontally and part of this wedge hole 215 opens to the cavity of the fixed column member 21. Each of the first and second wedges 211 and 212 has its corresponding inclined plane 2111/2112 and housed in the wedge hole 215 so that their sides face to each other. Those inclined planes 2111 and 2112 of the two wedges come to face the outer periphery of the cylindrical part of the moving column member 3.

Each of the first and second wedges 211 and 212 has its corresponding clamp bar hole 2113/2114 and a clamp bar 213 goes through this hole. The reaction members 2141 and 2142 of which diameter is larger than that of the clamp bar holes 2113 and 2114 are fixed to both ends of the clamp bar 213. The clamp bar 213 has a column clamp shaft hole 216 that comes in contact with one reaction member 2142 and a cross sectional part of the clamp shaft 6 goes through this hole. The cross sectional part is actually ellipse in shape.

A rocking arm 61 is fixed at one end of the column clamp shaft 6. The ellipse cross sectional part of the column clamp shaft 6, when unclamped, is inclined significantly in its long diameter direction as shown in FIG. 9. And, when clamped, as shown in FIG. 10, the long diameter side of the part faces almost in the axial direction of the clamp bar 213. Due to this configuration of the column clamp 21, if the rocking arm rotates in the state shown in FIG. 9, the column clamp shaft 6 rotates, thereby the column clamp goes into the state shown in FIG. 10. At this time, one of near-points of the ellipse major diameter part pushes the reaction member 2142 to the right, thereby the clamp bar 213 is pulled to the right and the reaction member 2141 comes to push the first wedge 211 further to the right. On the other hand, the second wedge 212 is pushed to the left by the other near-point of the ellipse major diameter part.

As a result, the two wedges come close to each other and each of the inclined planes 2111 and 2112 pushes against the outer periphery of the cylindrical part of the moving column member 3. The moving column member 3 is thus clamped to the fixed column member 2. The first and second wedges 211 and 212 are united into one to be slightly moved to the right/left, so that it never occurs that only one of the wedges pushes strongly against the moving column member 3.

If the rocking arm 61 rotates in the opposite direction, the first and second wedges 211 and 212 are separated from each other so that the moving column member 3 is unclamped.

* Operating the Operation Lever *

Next, a description will be made for the movement of the operation lever and each member to be moved by the operation lever 7. The operation lever 7 is provided under the steering column apparatus 1. In FIGS. 4 through 6 are shown a pusher plate 73 extended to the left from the operation lever 7 unitarily with the lever 7, a lever extension part 75 extended down from the operation lever 7 unitarily with the lever 7, the projection 71 described above, an unclamp keeping mechanism 8 provided at the column head 31. FIGS. 4 and 5 are bottom views of those items; the whole operation lever 7, as well as two states of the operation lever 7 for adjusting the position in the front-rear direction and the tilting angle of the steering wheel (that is, when the operation end of the lever 7 is pulled toward the steering wheel 92 and when the operation end is pushed to be separated from the steering wheel 92) that are denoted by a two-dot chain line and a solid line.

The extension part 75 of the operation lever 7 is supported by the lever center shaft 72B so as to be allowed to rock to the projection 71 at almost a middle point of the length. A pin 76 provided at the lower end of the lever extension part 75 is fit in the long hole 713 formed in the clamp lever 712. The long hole 713 is formed in the tangential direction of the rocking hole of the pin 76 around the lever center shaft 72B. The width of the parallel part of the long hole 713 is slightly larger than the diameter of the pin 76 so that when the operation lever 7 rocks, the outer periphery of the pin 76 does not touch the parallel part of the long hole 713. The operation level 7 can thus rock smoothly.

When the operation lever 7 denoted by a two-dot chain line in FIG. 4 is not pulled yet, that is, when the lever 7 is in the state a, the projection 71 is pushed to the left due to the bias of the energizing spring 711, thereby the tilt head 4 is clamped. At this time, the pin 76 is in contact with the left end arc part of the long hole 713. If the operation lever 7 is pulled toward the steering wheel 92 when in adjusting the tilting position, the clockwise rocking of the lever extension part 75 is transmitted to the left end of the long hole 713 through the pin 76, thereby the clamp lever 712 rocks clockwise assuming the lever center shaft 72A as its fulcrum. Consequently, if the operation lever 7 rocks at a point b denoted by a solid line in FIG. 4, the projection 71 united with the clamp lever 712 moves to the right, thereby the tilt head clamp 41 is unclamped.

If the operation lever 7 is pushed and separated from the steering wheel 92 when in adjusting the position of the steering wheel 92 in the front-rear direction, the projection 71 is prevented from moving further to the left, since the projection 71 is already pushed to the left due to the bias of the energizing spring 711 to clamp the tilt head 4. Consequently, the clamp lever 712 is kept idle during this time, the lever extension part 75 rocks counterclockwise assuming the lever center shaft 72B as its fulcrum. At this time, the pin 76 moves to the right along the long hole 713.

If the operation lever 7 is moved to the position c denoted by a solid line from the position a denoted by a two-dot chain line in FIG. 5, the pusher plate 73 provided at the left side of the operation lever 7 pushes in the pusher 81 of the unclamp keeping mechanism 8, thereby the column clamp 21 is unclamped through this unclamp keeping mechanism 8. Consequently, the single operation lever 7 can be pulled to unclamp the tilt head clamp 41 and pushed to unclamp the column clamp 21 independently of each other.

Figure 11:
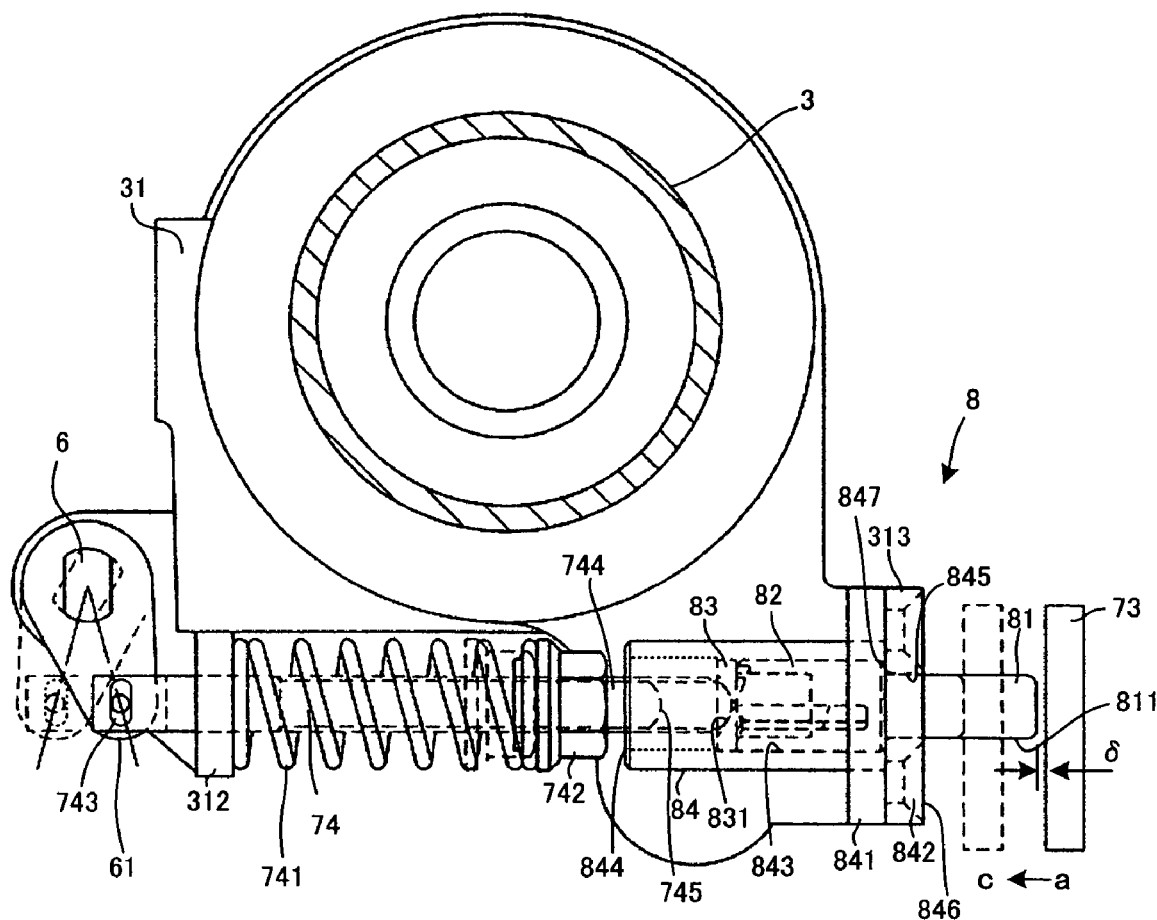
FIG. 11 is a D—D cross sectional view of FIG. 2.

A rod 74 (FIG. 11) is supported by a left rib 312 slidably in a direction parallel to the tilt center shaft 43. The rod 74 goes through an energizing spring 741 that pushes a nut 742 to the right as shown in FIG. 11. The rod is provided with a long small hole 743 at the left end part at a right angle to itself. The nut 742 is screwed onto a male screw provided at the outer periphery of the rod 74 to transmit the force of the spring 741 to the rod 74. The left end part of the rod 74 is engaged with one end of the rocking arm 61 (FIG. 11) through this long hole 743. The long hole 743 absorbs a positional deviation of the rod 74 from the rocking arm 61 when the rod moves in the axial direction.

The spring 741 pushes the rod 74 to the right (FIG. 11). The rocking arm 61 to engage with the rod at its left tip is forced to rotate counterclockwise. The rocking force applied to the rocking arm 61 keeps the clamped position of the column clamp shaft 6 (FIG. 10. Note that, however, the direction differs in FIG. 10 and FIG. 11, so that the right-left position is inverted). The inverted positions of the rocking arm 61 at those times are denoted by solid lines.

* Unclamp Keeping Mechanism *

Hereunder, a description will be made for both configuration and operation of the unclamp keeping mechanism 8 with reference to FIGS. 11 through 13. The unclamp keeping mechanism 8 is provided at the right rib 313 (FIG. 11) of the column head 31 on the same shaft as that of the rod 74. A flange 841 of a sleeve 84 that includes the movable part of the unclamp keeping mechanism 8 in itself is fixed to the rib 313 by two bolts 842. The sleeve 84 has a large diameter hole 843 in the same shaft as that of the rod 74 and the left side of the hole 843 opens to the left end face 844 of the sleeve 84. The right end part 744 of the rod 74 is inserted in the hole 843 through the left end face 844. The flange 841 also has a small diameter hole 845 in the same shaft as that of the hole 843. The left end of this small diameter hole 845 communicates with the large diameter hole 843. The small diameter hole 845 opens to the right end face of the flange 841.

In this large diameter hole 843 are inserted a pusher 81, a guide 82, and a shifter 83 in order from right to left. A right small diameter part 811 of the pusher 81 goes through the small diameter hole 845 and is protruded from the right end face 846 of the flange 841 to face a pusher plate 73. A spherical surface 745 is formed at the right end face of the rod 74 and this spherical surface 745 is in contact with a conical hole 831 formed at the left end face of the shifter 83 due to the energizing spring 741 that keeps pressing the shifter 83, the guide 82, and pusher 81 to the right respectively. The friction between the rod 74 and the shifter 83 is small, since the spherical surface 745 and the conical hole 831 are in line-contact with each other, so that it is easy for the shifter 83 to rotate relatively to the rod 74.

The right end face 821 (FIG. 12) is in contact with the right end step part (communicated with the small diameter hole 845) of the large diameter hole 843, so that the guide 82 never moves further to the right. The guide 82 is fixed by a knock pin (not shown) to be prevented from moving and rotating to the left. The guide 82 and the sleeve 84 may be formed of resin unitarily. In such a case, the right end face of the pusher 81 comes to face the pusher plate 73 with a slight gap δ(FIG. 11) therebetween.

Figure 12:
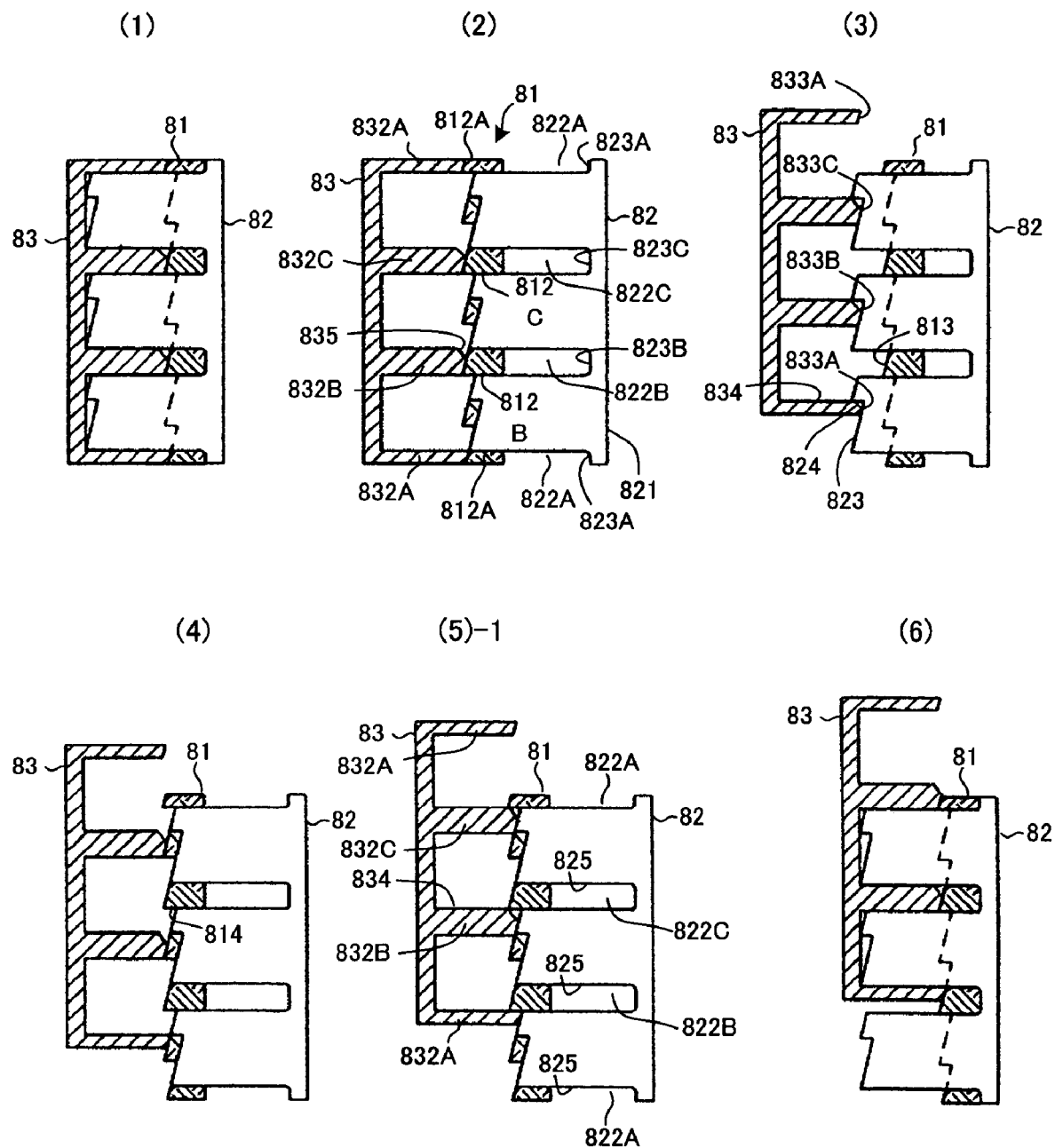
FIG. 12 is illustrations for describing the operation of an unclamp keeping mechanism 8 in the first embodiment of the present invention, as well as how its parts are developed on a flat plane.
Figure 13:
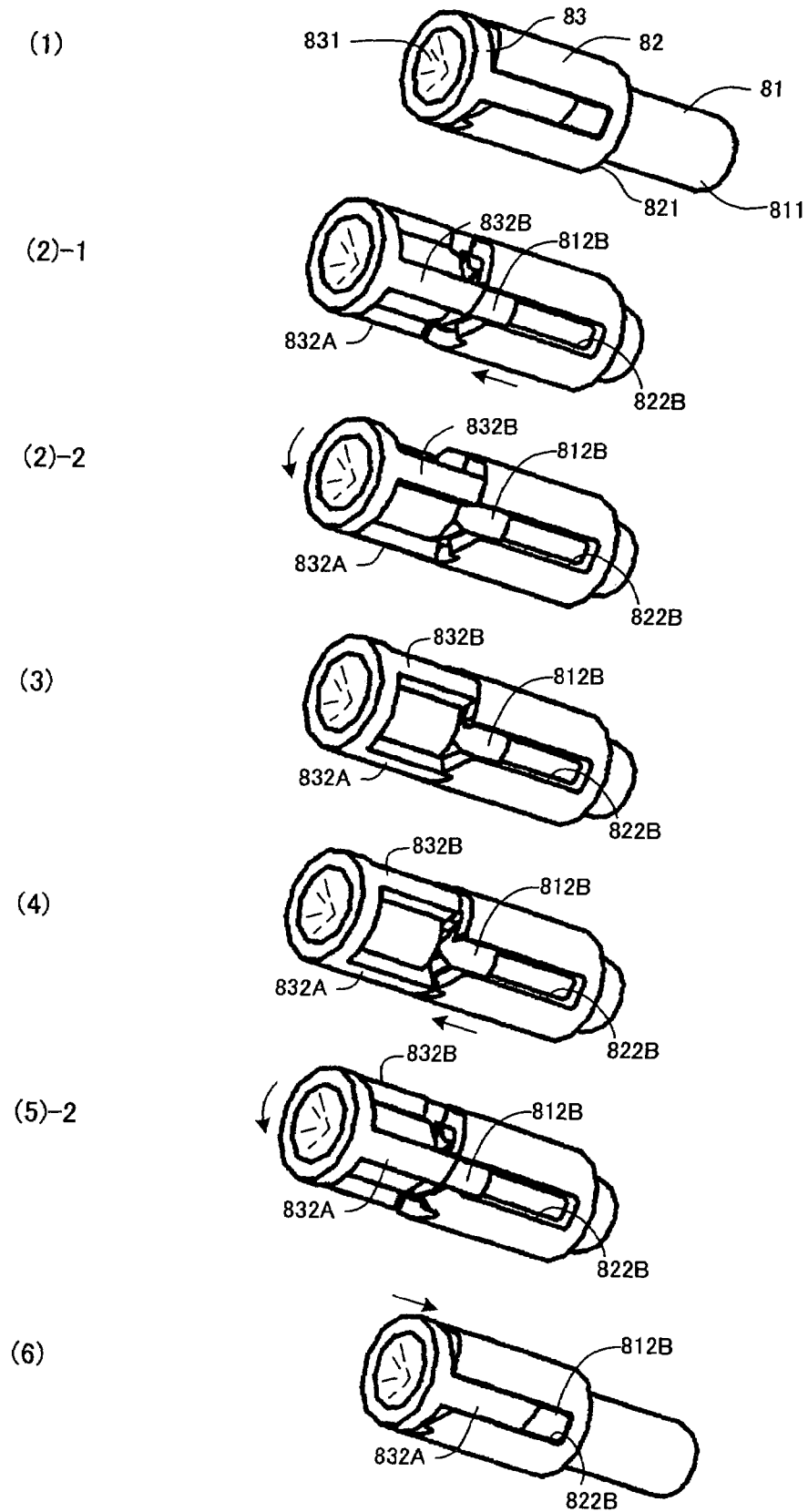
FIG. 13 is illustrations for describing the operation of the unclamp keeping mechanism in the first embodiment of the present invention, as well as perspective views of its parts disposed therein.

FIGS. 12 and 13 are illustrations for describing both structure and operation of each of the pusher 81, the guide 82, and the shifter 83 in detail. FIG. 12 is an illustration for developing those parts on a flat plane and FIG. 13 is a perspective view of those parts. The (1), (2) . . . in FIGS. 12 and 13 are sequential numbers denoting how the states of those parts are changed while the "-1", "-2", . . . denote slight state changes to occur before/after the subject state.

As shown in FIGS. 12 and 13, the pusher 81, the guide 82, and the shifter 83 are all cylindrical in shape and all the same in maximum diameter, a little smaller than the diameter of the large diameter hole 843. They are all fit in the large diameter hole 843. The guide 82 is shaped like a hollow cylinder and three guide grooves 822A to 822C are formed on the circumference of the hollow cylinder at equal pitches. Those grooves 822A to 822C are extended in parallel in the axial direction of the guide 82. The left side of each of the guide grooves 822A to 822C opens to the left end face of the guide 82 and the right side ends just before the right bend face of the guide 82 to form bottom faces 823A to 823C respectively.

Each of the pusher 81 and the shifter 83 has a small diameter shaft part fit in the inner periphery of the hollow cylinder of the guide 82 slidably in the axial direction in the inner periphery of the guide. Each of the pusher 81 and the shifter 83 has three projections 812A to 812C and 832A to 832C protruded from the small diameter shaft part in the radial direction. The external diameter of the projections is the same as that of the guide 82. Those projections 812A to 812C and 832A to 832C are fit in the guide grooves 822A to 822C slidably in parallel to each other in the axial direction relatively to the guide 82.

The right end faces of the projections 832A to 832C of the shifter are formed as inclined planes 833A to 833C. The left end faces of the pusher 81 and the guide 82 are formed as 6 inclined planes 813 to 823 at the same angle as that of the inclined planes 833A to 833C at equal pitches on their circumferences. The inclined plane 813 of the pusher 81 is shifted by a half pitch from the inclined plane 823 of the guide 82 on the circumference.

At the position a of the pusher plate 73 denoted by a solid line in FIG. 11, the rod 74 is pushed to the right by the energizing spring 41, thereby, the shifter 83 and the pusher 61 are pushed to the right respectively. As a result, the right end faces of the projections 812A to 812C of the pusher 81 come in contact with the bottom faces 823A to 823C of the guide grooves 822A to 822C and end there. The inclined planes 833A to 833C of the projections 832A to 832C of the shifter 83 are in contact with the inclined planes 813 of the projections 812A to 812C of the pusher 81 and surrounded by the guide grooves 822 of the guide 82, so that the shifter 83 also ends at the right row end. FIGS. 12 (1) and 13 (1) show this state respectively. While the operation lever 7 is not operated, the unclamp keeping mechanism 8 keeps clamping the column clamp shaft 6.

If the operation lever 7 is pushed from the position a to the position c in FIG. 5, the pusher plate 73 moves to the position c denoted by a dotted line from the position a denoted by a solid line and the pusher 81 moves to the left in FIG. 11. The guide 82 is fixed at the sleeve 84, so that it never moves in any of axial and rotational directions. On the other hand, the shifter 83 and the pusher 81 are pushed to the left to move the rod 74 to the left in FIG. 11, thereby the moving column member 3 is unclamped. When the pusher 81 reaches the left end, the projections 832A to 832C of the shifter 83 are released from the guide grooves 822A to 822C.

FIG. 12(2) and FIG. 13(2)-1 show such state changes. After that, the inclined plane 813 of the pusher 81 is aligned to the inclined plane 823 of the guide 82 on the same plane, so that the shifter 83 rotates along the inclined planes 813 and 823 due to the energizing force of the energizing spring 741 as shown in FIG. 12(2)-2. At this time, because the shifter 83 is guided by the large diameter hole 843 of the sleeve 84, the shifter 83 rotates smoothly. In addition, the shifter 83 rotates smoothly with respect to the rod 74, since the conical hole 831 of its left end face is in line-contact with the spherical surface 745 formed at the right end of the rod 74.

When the driver takes his/her hand off the operation lever 7, the operation lever 7 and the pusher 81 become free. At this time, the pusher plate 73 maybe pushed by the energizing spring 741 against the pusher 81 to stabilize the position of the operation lever 7. The shifter 83 keeps pushing the inclined plane 813 of the pusher 81 to the right with use of the energizing force of the energizing spring 741 at the rounded part 835 formed at the side face 834 of each of the projections 832A to 832C of the shifter 83 and continues rotating along the inclined plane 823. As shown in FIG. 12(3) and FIG. 13(3), the shifter 83 rotates by 60° to let the side face 834 of each of the projections 832A to 832C come in contact with the root part 824 of the inclined plane 823 of the guide 82, then stops there.

Consequently, the shifter 83 stops at the left row end. This state is kept even after the driver takes his/her hand off the lever 7. The moving column member 3 is thus kept unclamped and the driver can use both of his/her hands to adjust the steering wheel in the front-rear direction. As a result, the adjustment becomes easier.

After completing the adjustment of the steering wheel in the front-rear direction, if the position of the operation lever 7 is shifted from position a to position c again, the pusher 81 moves to the left again. At this time, the inclined planes 833A to 833C of the shifter 83 are pushed by the inclined planes 813 of the pusher 81 to move to the left. The inclined planes 833A to 833C of the shifter 83 are thus disengaged from the root 824 of the inclined plane 823 and, as shown in FIG. 12(4) and FIG. 13(4), the inclined plane 813 of the pusher 81 is aligned to the inclined plane 823 of the guide 82 on the same plane. After that, the shifter 83 is pushed by the energizing spring 741 to rotate along the inclined plane 813/823 as shown in FIG. 12(5)-1.

As shown in FIG. 12(5)-1, the side faces of the projections 832A to 832C of the shifter 83 come in contact with the side faces 814 of the projections 812A to 812C of the pusher 81. The shifter 83, pushed by the energizing spring 41, keeps pushing the side face 814 of the pusher 81 to the right at the rounded part 835 formed at the side face 834 of each of the projections 832A to 832C of the shifter 83 and continues its rotation.

As shown in FIG. 13(5)-2, the shifter 83 rotates 60° (⅙ turn), thereby the side faces 834 of its projections 832A to 832C come in contact with the side faces 825 of the guide grooves 822A to 822C, then stops there. At this time, the guide groove 822A and the projection 832C, the guide groove 822B and the projection 832A, and the guide groove 822C and the projection 832B are aligned respectively on a straight line in the axial direction. The shifter 83 is then pushed by the energizing spring 741 to move to the right along the guide grooves 822A to 822C so as to move the projections 812A to 812C of the pusher 81 to the right as shown in FIG. 13(6), then returns to the right row end. This state is the same as that shown in FIG. 12(1) and FIG. 13(1); the moving column member 3 is clamped and kept in that state even after the driver takes his/her hand off the operation lever 7.

In the first embodiment described above, the unclamp keeping mechanism 8 keeps unclamping the telescopic mechanism that requires a especially large operation power. The mechanism 8 may also be used to keep unclamping the tilting mechanism. The mechanism 8 in this first embodiment may also be provided for both of the telescopic mechanism and the tilting mechanism.

* Pusher Plate *

Figure 14:
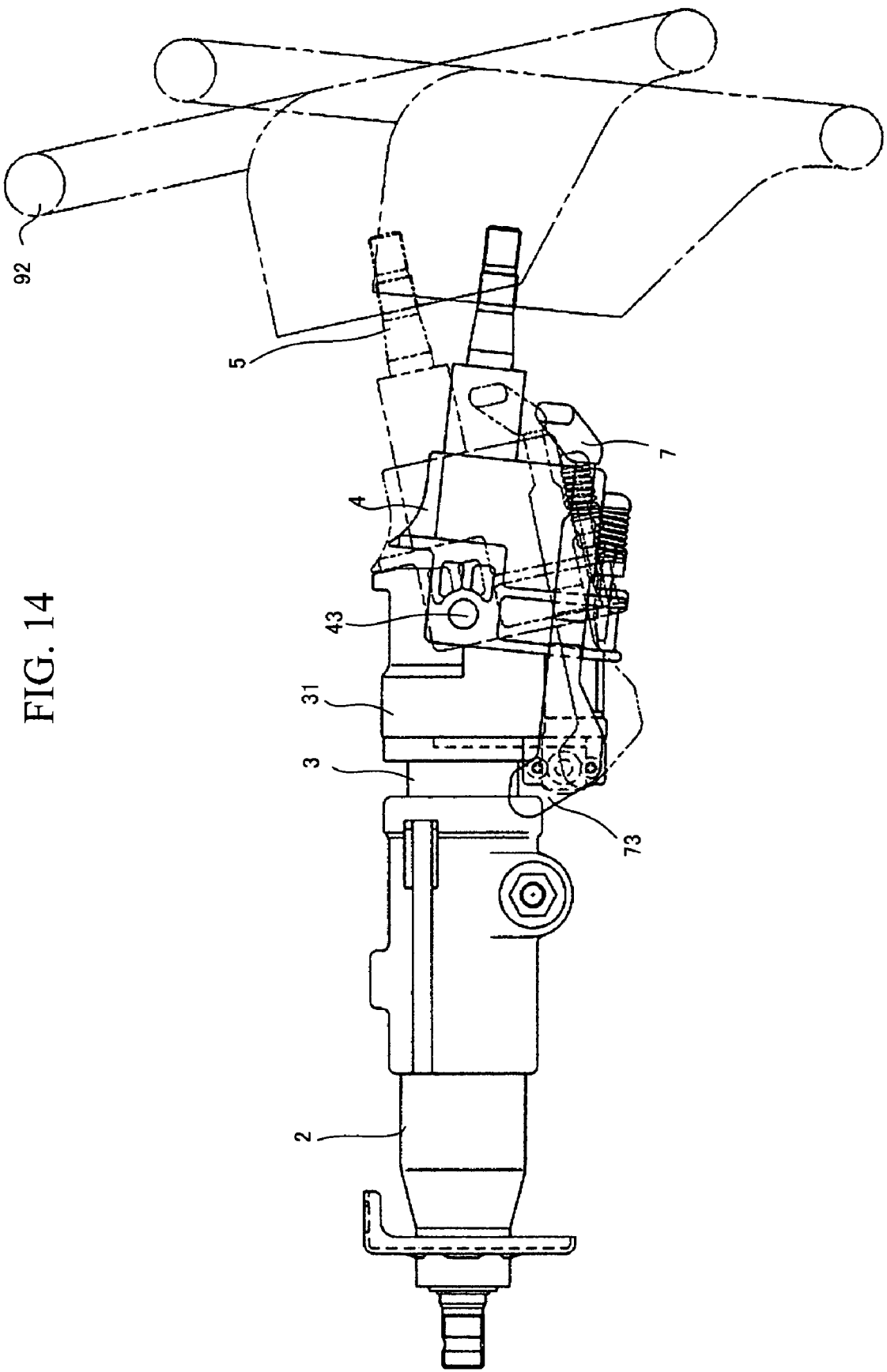
FIG. 14 is an illustration for describing two positions denoted by a dotted line and a solid line, to which a tilt head 4 in the first embodiment of the present invention are tilted.

The tilt head 4 tilts on the column head 31, so that the relative position between the pusher plate 73 and the pusher 81 changes according to how much the tilt head 4 tilts (tilting angle). FIG. 14 shows two positions to which the tilt head tilts by a broken line and a solid line. Because the pusher 81 is supported by the column head 31, its position does not change according to such a tilting angle. However, because the pusher plate 73 is separated from the tilt center shaft 43, its relative position to the pusher 81 changes when the tilt head 4 tilts.

This is why the pusher plate 73 is provided with such a bent wide contact plane as a hockey stick so that the pusher 81 can come in contact with the pusher plate 73 at any angle at a view in FIG. 14. The tilt head 4 is clamped by the energizing spring 711 and the moving column member 3 is clamped by the energizing spring 741.

* How to Adjust the Steering Wheel *

Here under, a description will be made for how to operate each member and how the member acts in the first embodiment when in adjustment of the position in the front-rear direction and the tilting angle of the steering wheel 92.

** Adjustment of the Tilting Angle

When adjusting the angle of the steering wheel 92, the driver is requested to take his/her hand off the steering wheel 92 and pull the operation lever 7 (from position a to position b) with the disengaged hand (FIG. 4). Consequently, the operation level 7 rocks the clamp lever 712 around the lever center shaft 72A as shown in FIG. 4 (the right-left position is reversed in FIG. 4, since FIG. 4 is a bottom view).

When the clamp lever 712 rocks such way, the projection 71 moves to the right and the gear arm 44 rotates counter clockwise in FIG. 2. According to the rotation of the gear arm 44, the segment gear 33 is disengaged from the gear part 442 of the gear arm 44, thereby the tilt head 4 can be adjusted for the tilting angle (FIG. 4). And, because the tilting angle can be adjusted with less force than the front-rear direction, the driver can adjust the steering wheel 92 with one hand.

FIG. 14 shows how the steering wheel 92 is adjusted between two angles denoted by a solid line and a chain line. In this stage, the moving column member 3 is still clamped. Therefore, only the tilting mechanism can be adjusted. The driver, when just getting in/out of the car, is required to push the steering wheel 92 forward to make a wider space there. In addition, because the driver can operate the operation lever with a small force easily at this time, it is always easy for the driver to get in/out of the car frequently.

** Adjustment of the Front-Rear Direction (Length of the Steering Column Apparatus)

When adjusting the position of the steering wheel 92 in the front-rear direction (the length of the steering column apparatus), the driver takes his/her hand off the steering wheel 92 and pushes the operation lever 7 (from position a to position c) with the free hand. The operation lever 7 thus rocks around the lever center shaft 72B, thereby the pusher plate 73 rocks up to a position denoted by a solid line in FIG. 5 and pushes the pusher 81 to the left up to a position denoted by a broken line in FIG. 11 resisting the energizing force of the energizing spring 741.

The movement of the pusher 81 in the right-left direction is converted to a movement of the shifter 83 of the unclamp keeping mechanism 8 to the left. The movement of this shifter 83 move the rod 74 to the left as shown in FIG. 11, thereby causing the rocking arm 61 to rock and the column clamp shaft 6 to rotate clockwise respectively. When the column clamp shaft 6 rotates such way, the column clamp shaft 6 of which major diameter part is almost horizontal as shown in FIG. 9 inclines as shown in FIG. 9. Consequently, the first and second wedges 211 and 212 that have been close to each other as shown in FIG. 8 are separated, thereby the moving column member is unclamped.

Figure 15:
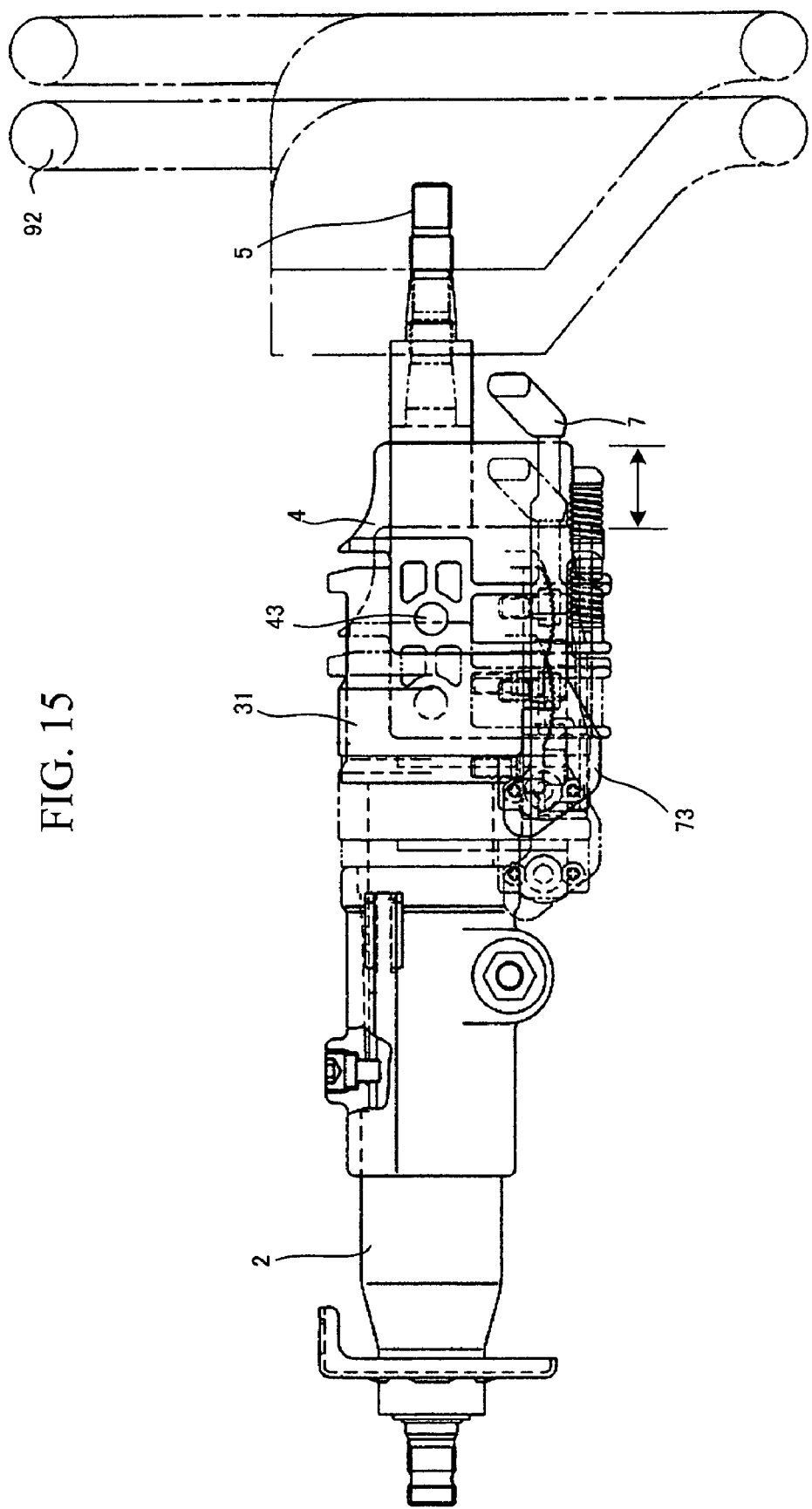
FIG. 15 is an illustration for describing two positions denoted by a dotted line and a solid line, to/from which a moving column member 3 in the first embodiment of the present invention is moved forward/backward.

The unclamp keeping mechanism 8, as shown in FIG. 12(3), keeps the shifter 83 unclamped, so that it enables the driver to take his/her hand off the operation lever 7 and operate the steering wheel 92 with both hands to adjust the position of the steering wheel 92 in the front-rear direction. FIG. 15 shows how the steering wheel 92 is adjusted between two positions in the front-rear direction with a solid line and a chain line.

Completing the adjustment of the steering wheel 92 in the front-rear direction, the driver takes his/her hand off the steering wheel 92 to push the operation lever 7 again with the free hand (from position a to position c). The pusher 81 then moves the shifter 83 to the left again, thereby the shifter 83 rotates to return to the right row end as shown in FIG. 12(6). This movement of the shifter 83 moves the rod 74 to the right as shown in FIG. 11, which then causes the rocking arm 61 to rock and the column clamp shaft 6 to rotate counterclockwise respectively.

When the column clamp shaft 6 begins rotating, the major diameter part of the column clamp shaft 6, which has inclined as shown in FIG. 9, restores its almost horizontal position as shown in FIG. 10. Consequently, the first and second wedges 211 and 212 get close to each other, so that the moving column member is clamped. And, because the unclamp keeping mechanism 8 keeps the shifter 8 positioned at the right row end as shown in FIG. 12(6) even when the driver takes his/her hand off the operation lever 7, the column clamp 21 is kept clamped.

Such way, the operation lever 7 can be pulled to tilt the tilt head 4 and pushed to move the column head 31 in the front-rear direction. The operation lever 7 can thus be pushed again to clamp the column head 31 with respect to the movement in the front-rear direction, so that the operation lever 7 can be used selectively to adjust the position in the front-rear direction or the tilting position of the steering wheel 92.

When the tilt head clamp 41 is unclamped, the tilt head 4 comes to receive a strong downward force. This is why the tilt head 4 is provided with a strong counter-balance spring 45 so that the tilt head 4 is given a force enough to cancel such a downward force and keep the steering wheel 92 at the top tilting position, thereby making it easier for the driver to get in/out of the car.

According to the first embodiment described above, therefore, a single operation lever provided apart from the steering wheel can be used to operate the clamp/unclamp mechanism of each of the telescopic mechanism and the tilting mechanism independently. In addition, even if the driver takes his/her hand off the operation lever when unclamping at least one of the telescopic mechanism and the tilting mechanism, at least one of the telescopic mechanism and the tilting mechanism is kept unclamped. The driver can thus use both of his/her hands to adjust at least either the position in the front-rear direction or tilting angle of the steering wheel, thereby the driver's adjustment of the steering wheel becomes easier.

Furthermore, if both of the telescopic mechanism and the tilting mechanism that are unclamped can be kept unclamped even after the driver takes his/her hand off the operation lever, the driver can use both of his/her hands to adjust both of the position in the front-rear direction and the tilting angle of the steering wheel. The driver's adjustment of the steering wheel thus becomes easier. In addition, because no cable is used for the steering column apparatus, there is nothing unbecoming that might be protruded from the steering column apparatus, thereby troubles are prevented. Both reliability and operability of the device are thus improved.

Furthermore, because the single operation lever can be pulled to clamp/unclamp the tilting mechanism and pushed to clamp/unclamp the telescopic mechanism, the operation is simple and easy for the driver. The operating direction of the operation lever may also be changed so that the lever is pushed to clamp/unclamp the tilting mechanism and pulled to clamp/unclamp the telescopic mechanism.

Second Embodiment

FIGS. 16 through 27 show a steering column apparatus in the second embodiment of the present invention respectively. In the second embodiment, the steering column apparatus enables the single operation lever to be used to clamp/unclamp both of the telescopic mechanism and the tilting mechanism, as well as to keep both of the telescopic mechanism and the tilting mechanism in that state even after the driver takes his/her hand off the operation lever.

* General Description

Figure 16:
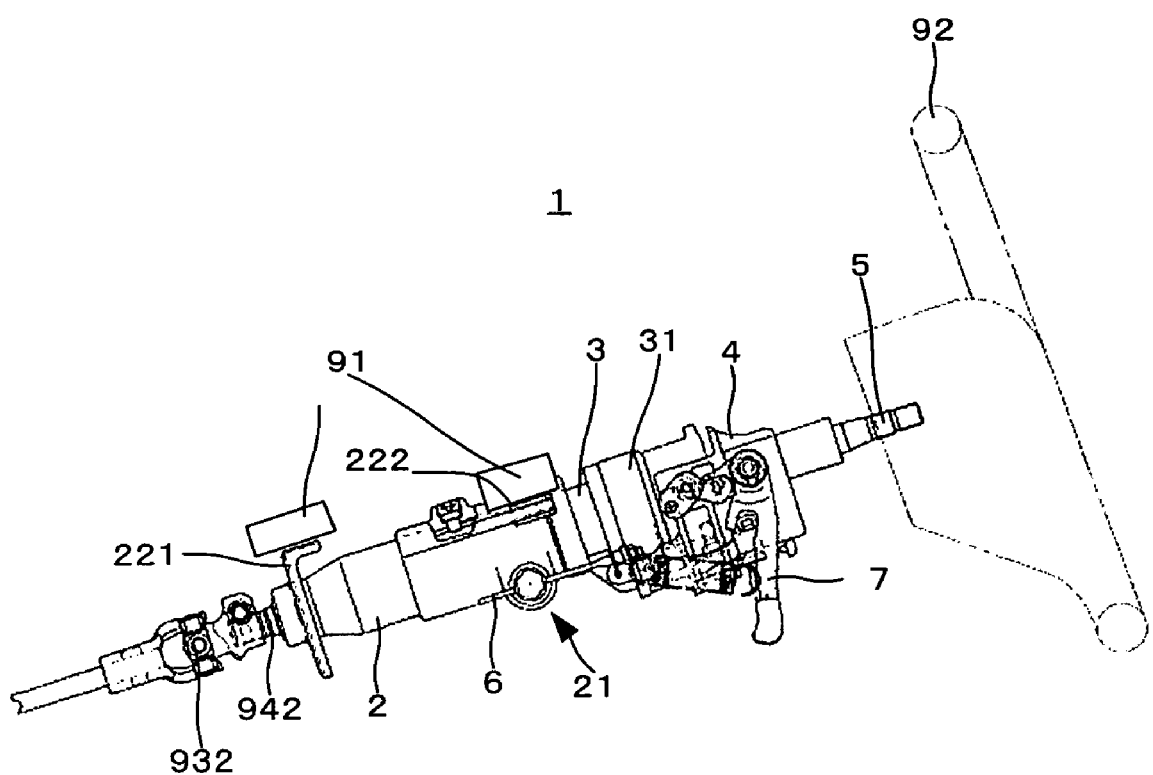
FIG. 16 is an external view of a steering column apparatus 1 in the second embodiment of the present invention.

FIG. 16 shows an external view of the steering column apparatus in the second embodiment of the present invention. The steering column apparatus 1 includes a fixed column member 2, a moving column member 3, a column head 31, a tilt head 4, a wheel shaft 5, a column clamp 21, a tilt head clamp 41 (FIG. 7), and an operation lever 7.

Figure 18:
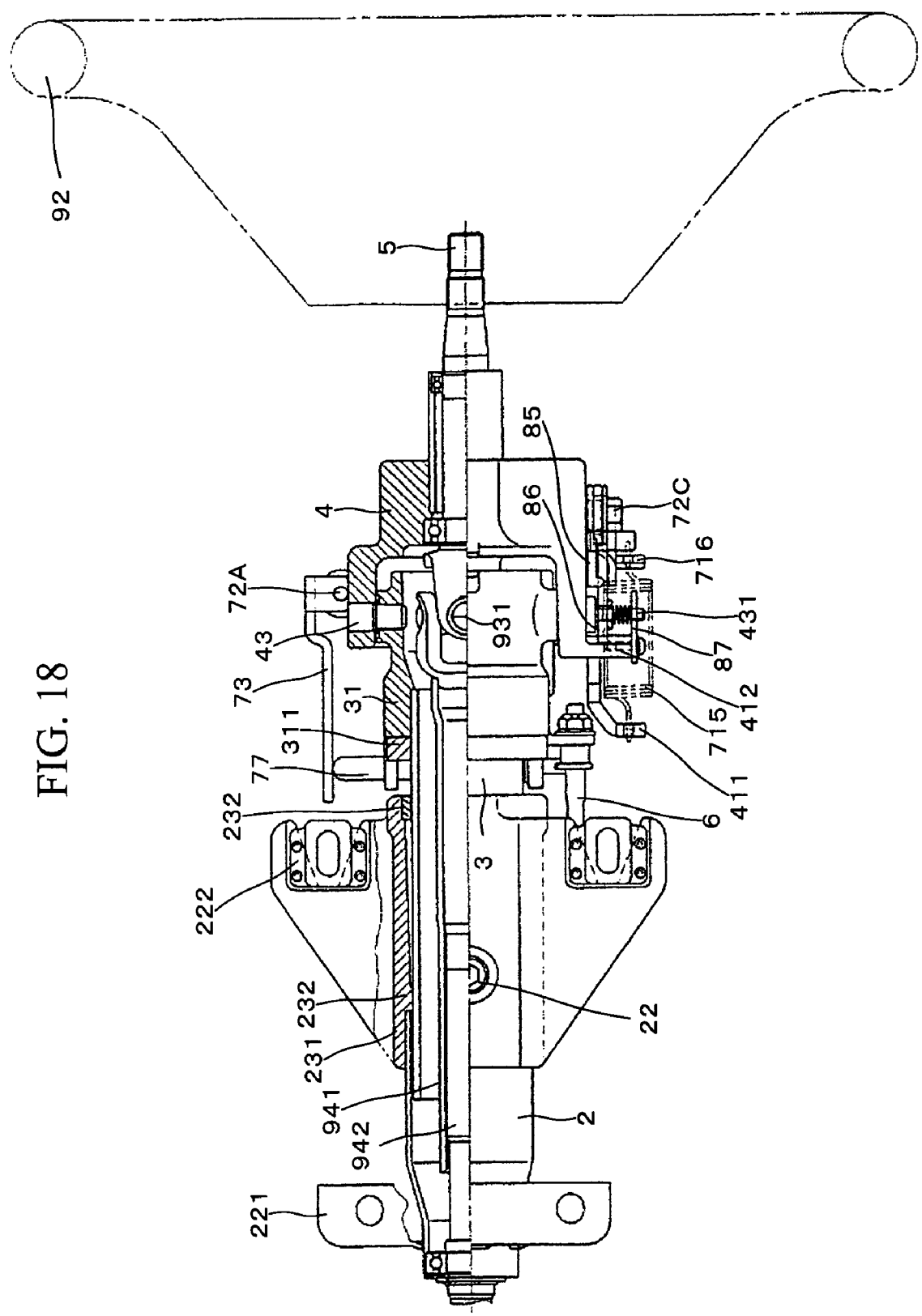
FIG. 18 is a top view from the direction P of the steering column apparatus 1 in FIG. 17.

The fixed column member 2 includes car body mounting parts 221 and 222. The fixed column part 2 is attached to the vehicle body with these body mounting parts 221 and 222. The fixed column member 2 supports a moving column member 3 unrotatably around the center shaft 43 and movably toward the center shaft. The column head 31 is provided at one end of the moving column member 3. This column head 31 supports the tilt head 4 tiltably around the center shaft 43 (FIG. 18). The tilt head 4 supports the wheel shaft 5 rotatably and a steering wheel 92 is fixed at one end of the tilt head 4.

The column head 31 is provided with a column clamp shaft 6 rotatably around a shaft disposed in parallel to the center shaft 43 of the moving column member 3. The fixed column member 2 is provided with a column clamp 21 that can move relatively to the column clamp shaft 6. According to the rotation of this column clamp shaft 6, the moving column member 3 is clamped/unclamped.

The column head 31 is provided with a tilt head clamp 41, which clamps/unclamps the tilt head 4 to/from the column head 31. The tilt head 4 supports a single operation lever 7. The grip of this operation lever 7 is disposed apart from the steering wheel 92. Consequently, the driver is prevented from touching the operation lever by accident when operating the steering wheel 92 during a drive, thereby the moving column member 3 or tilt head 4 is prevented from being unclamped unexpectedly. In addition, such a disposition of the operation lever 7 also makes it easier for the driver to operate the switches disposed around the steering wheel 92.

If the operation lever 7 rocks so as to get closer to the steering wheel 92, the follower lever 714 (FIG. 20) rocks, the column clamp shaft 6 rotates, and this rotation is transmitted to the column clamp 21 so as to clamp/unclamp the moving column member 3. At the same time, the tilt head 4 is also clamped/unclamped.

One end of the wheel shaft 5 is connected to a universal joint 931 in the steering column apparatus 1 and further to a mechanism for deciding the direction of the front wheels through a pair of spline-connected upper middle shafts 941 (FIG. 18), a lower middle shaft 942, and a lower universal joint 932.

* Tilt Head Clamp *

Figure 17:
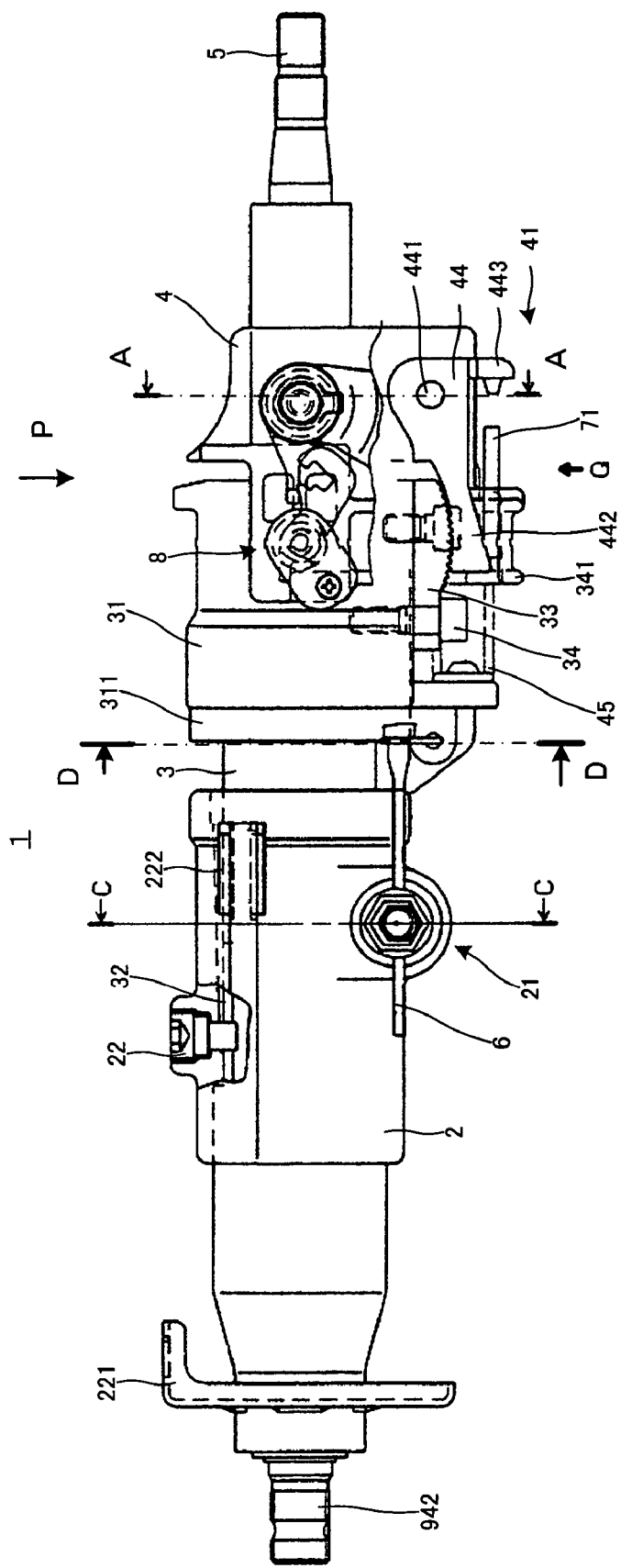
FIG. 17 is an enlarged view of the steering column apparatus 1.
Figure 19:
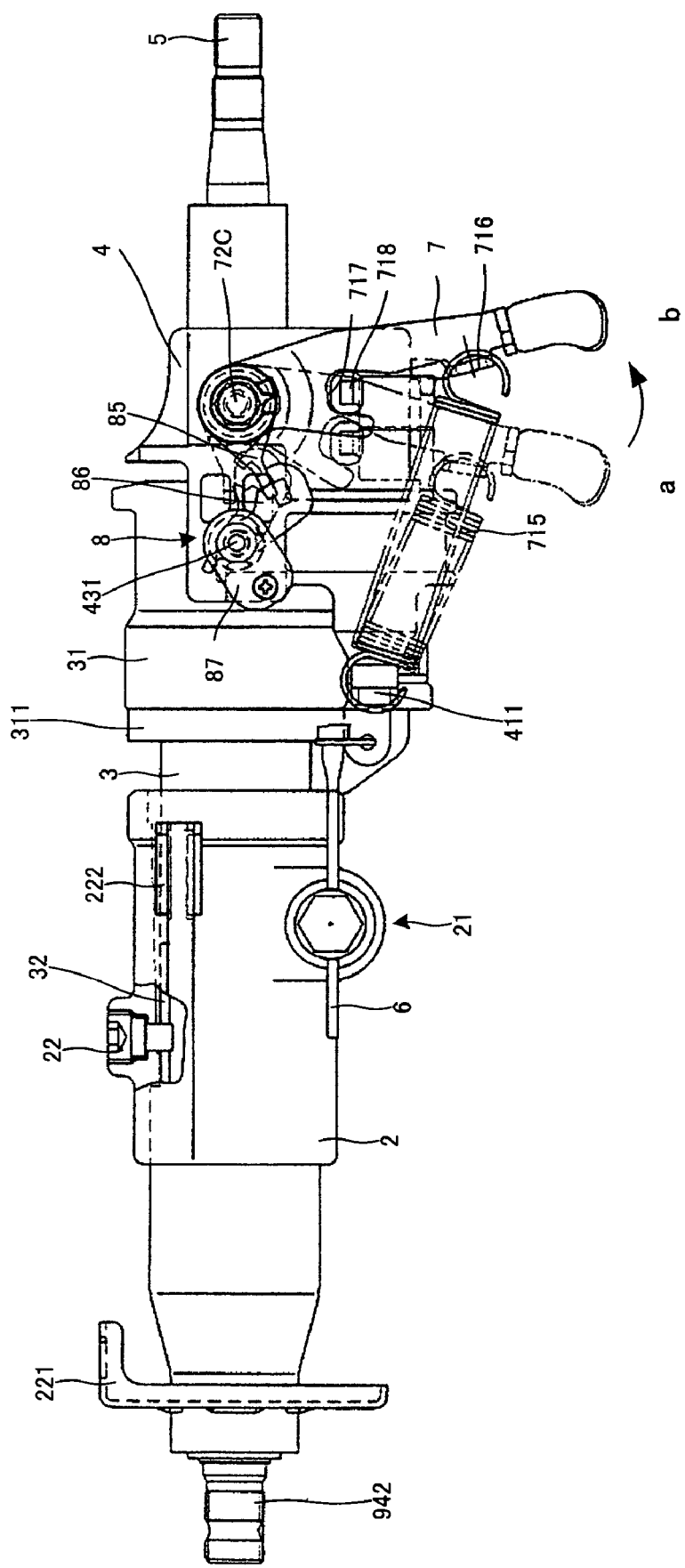
FIG. 19 is an enlarged side view of a major portion of the steering column apparatus 1 shown in FIG. 17.
Figure 20:
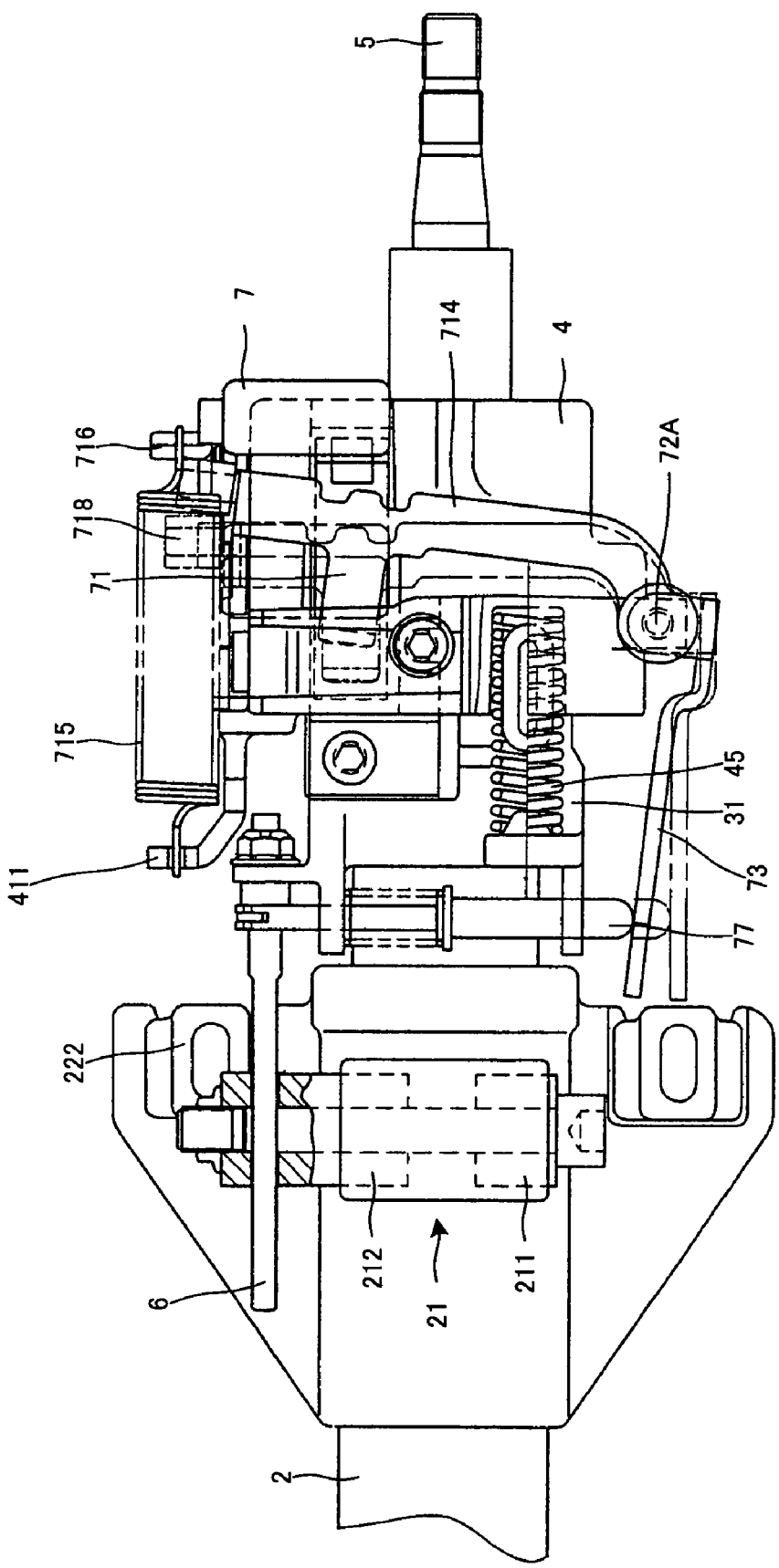
FIG. 20 is a bottom view of the steering column apparatus 1 from the direction Q in FIG. 17.
Figure 21:
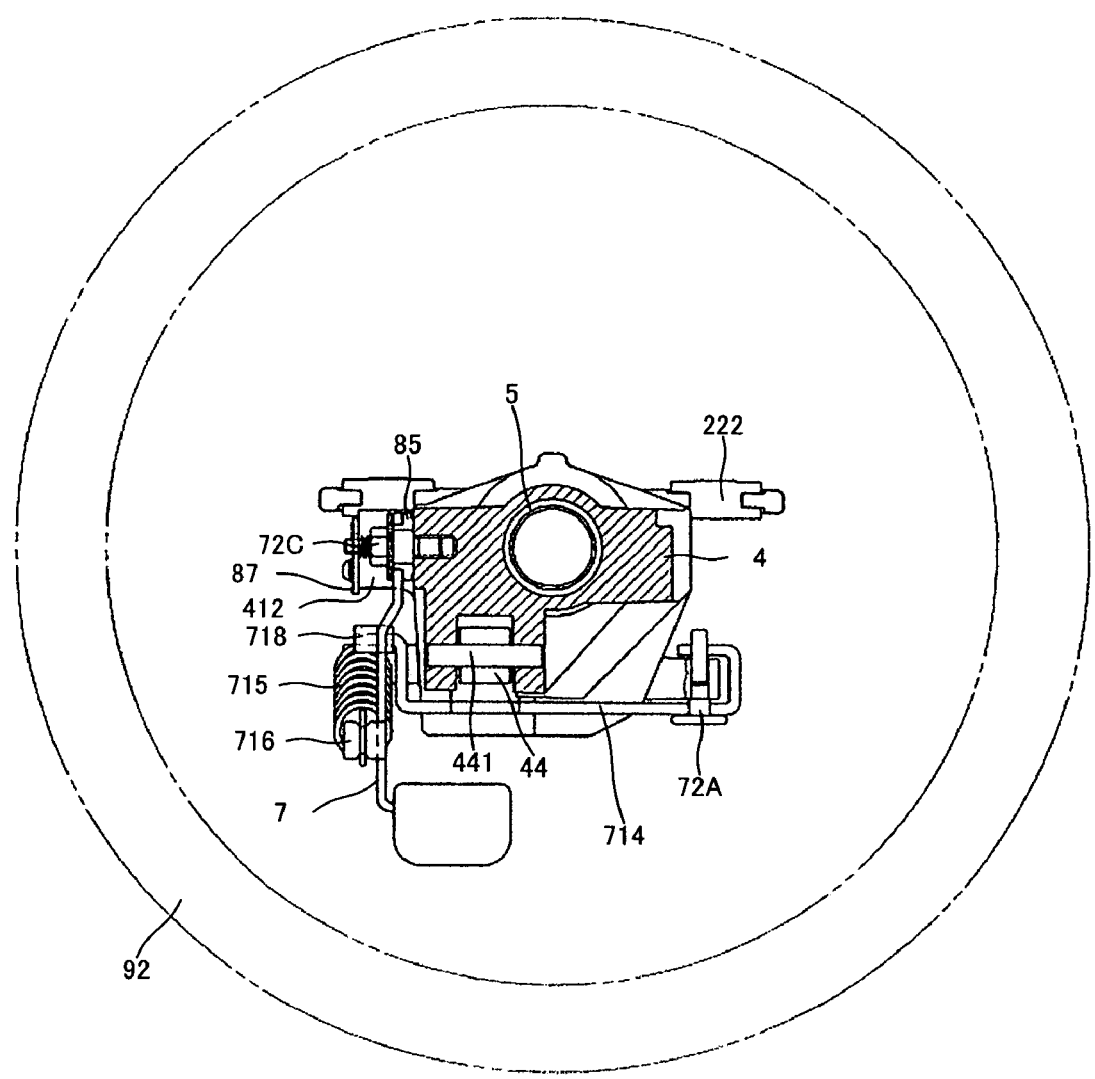
FIG. 21 is an A—A cross sectional view of FIG. 17.
Figure 22:
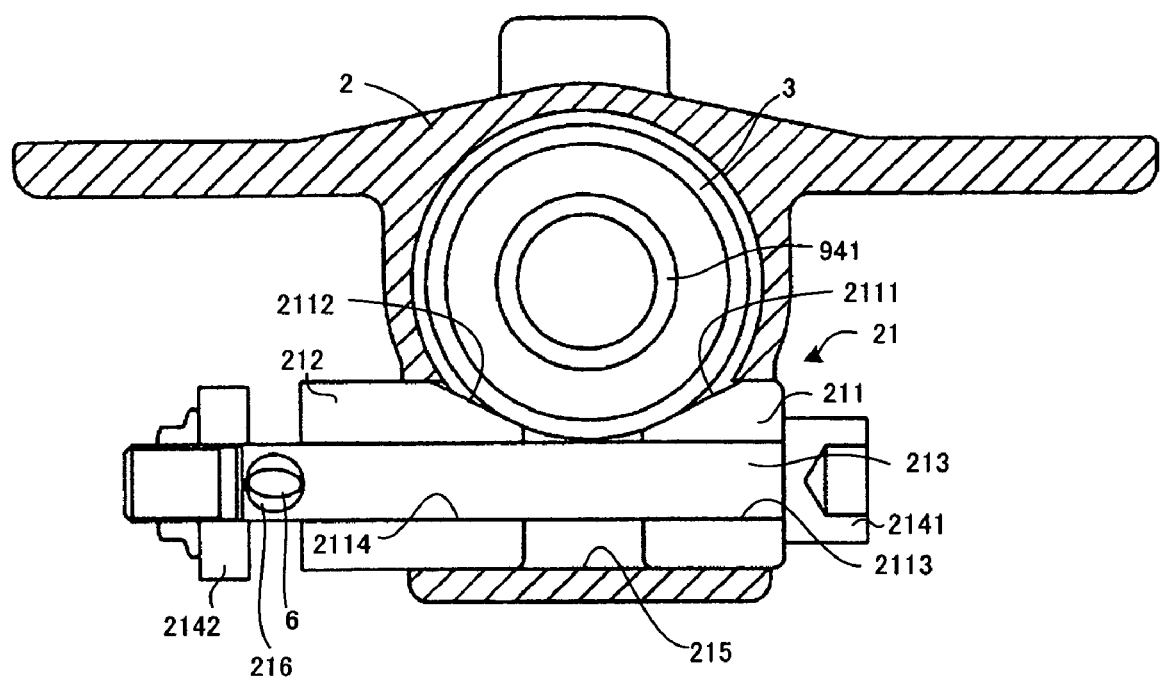
FIG. 22 is a C—C cross sectional view of FIG. 17.

FIG. 17 shows an enlarged view of a major portion of the steering column apparatus shown in FIG. 16, from which part of the steering column apparatus are omitted. FIG. 18 is a top view (P direction) of the steering column apparatus 1 shown in FIG. 17. FIGS. 19 shows an enlarged view of the major portion of the steering column apparatus 1. FIG. 20 is a bottom view (from the Q direction) of the steering column apparatus 1 shown in FIG. 17. In FIGS. 19 and 20, the two-dot chain line denotes a state in which the operation lever is not pulled yet and the solid line denotes a state in which the operation lever 7 is pulled toward the steering wheel 92. FIGS. 21 and 22 show A—A and C—C cross sectional views of FIG. 17 respectively.

The tilt head clamp 41 is configured as follows. A segment gear 33 that is centered at the tilt center shaft 43 is fixed to the column head 31 by a bolt 34 and a back rest member 341 is provided between the column head 31 and the segment gear 33 with a space therebetween. On the other hand, in the space are disposed a gear part 442 of a gear arm 44 supported by the tilt head 4 rotatably around a shaft 441, as well as a projection 71. A lever center shaft 72A is attached to the tilt head 4 and a follower lever 714 (FIGS. 20 and 21) that rocks around the center shaft 72A is formed unitarily with the projection 71.

The gear arm 44 is shaped like an L-letter (FIG. 17) consisting of two legs. The gear part 442 is formed at one of the legs. The other leg is formed at the gear arm 44.

In FIG. 17, if the projection 71 is pushed to the left, the projection pushes the gear part 442 from behind, so that the gear part 442 is pushed toward the segment gear 33, thereby the gear part 442 and the segment gear 33 are engaged by their teeth. When the gear part 442 pushes the segment gear 33, the reaction applied to the projection 71 is transmitted to the back rest member 341. Consequently, the tilt head 4 is fixed to the column head 31. At this time, the tilt head 4 is fixed step by step at each angle position where the gear part 442 and the segment gear 33 are engaged. When the projection 71 moves to the right in FIG. 17, the gear arm 44 rotates counterclockwise around the shaft 441 in FIG. 17 due to its own weight. They are thus disengaged, thereby the tilt head clamp 41 is unclamped.

* Universal joint and Middle Shaft

As shown in FIG. 18, an upper universal joint 931 is formed between an end of the upper middle shaft 941 and an end of the wheel shaft 5. And, because the center of the universal joint 931 is on the axis line of the center shaft 43, the universal joint 931 is never affected by tilting of the tilt head 4.

The lower middle shaft 942 is supported by the fixed column member 2 rotatably and the lower middle shaft 942 and the upper middle shaft are spline-connected to each other. The moving column member 3 is thus movable in both right and left directions shown in FIG. 18. The rotation of the upper middle shaft 941 is transmitted to the lower middle shaft 942 regardless of where the moving column member 3 moves to, since the lower middle shaft 942 and the upper middle shaft 941 are spline-connected to each other. Consequently, the position of the steering wheel 92 is adjusted in the front-rear direction, the rotation of the steering wheel 92 is transmitted to the lower middle shaft 942.

* Fixed Column Member and Moving Column Member *

As shown in FIG. 17, the cylindrical part of the moving column member 3 has a long hole 32 formed in its axial direction. A stopper member 22 provided at the fixed column member 2 is fit in this ling hole 32. Both of the long hole 32 and the stopper member 22 are used to prevent the moving column member 3 from disengagement from and rotation with respect to the fixed column member 2. The moving column member 3 is thus allowed to move in the fixed column member 2 in the axial direction just in the long hole 32. A cushion stopper 311 provided at an end face of the column head 31 prevents both metals of the column head 31 and the fixed column member 2 from strong collision when the column head 31 hits against the end face of the fixed column member 2 during an adjustment. The cushion stopper 311 is made of synthesized resin or the like.

* Column Clamp *

Figure 23:
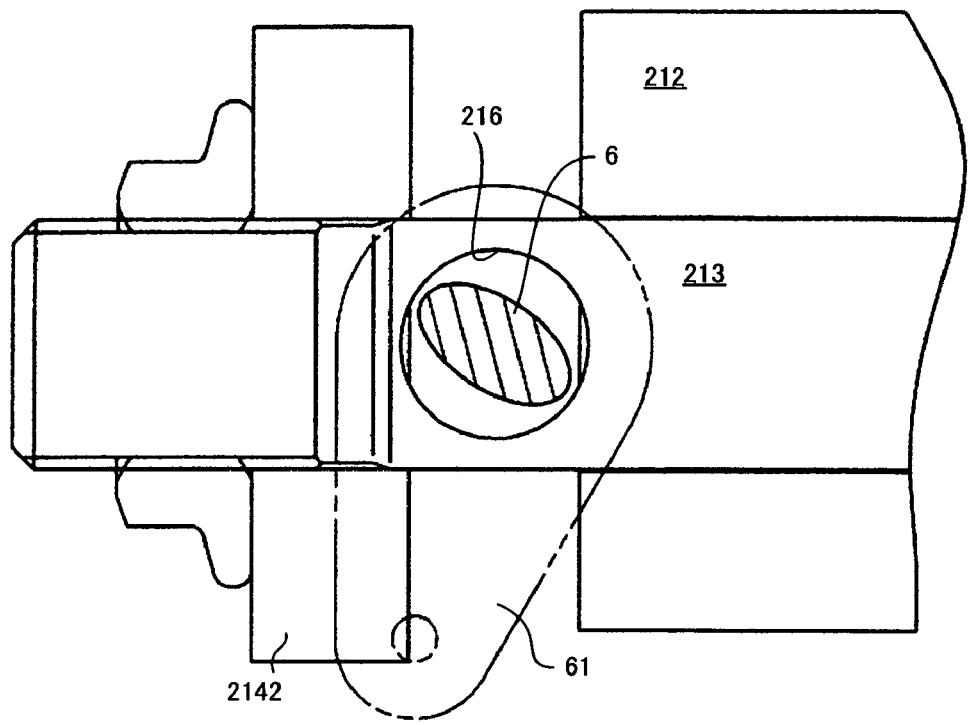
FIG. 23 is an enlarged view of part of FIG. 22, denoting a position to which a column clamp shaft is rotated and unclamped.
Figure 24:
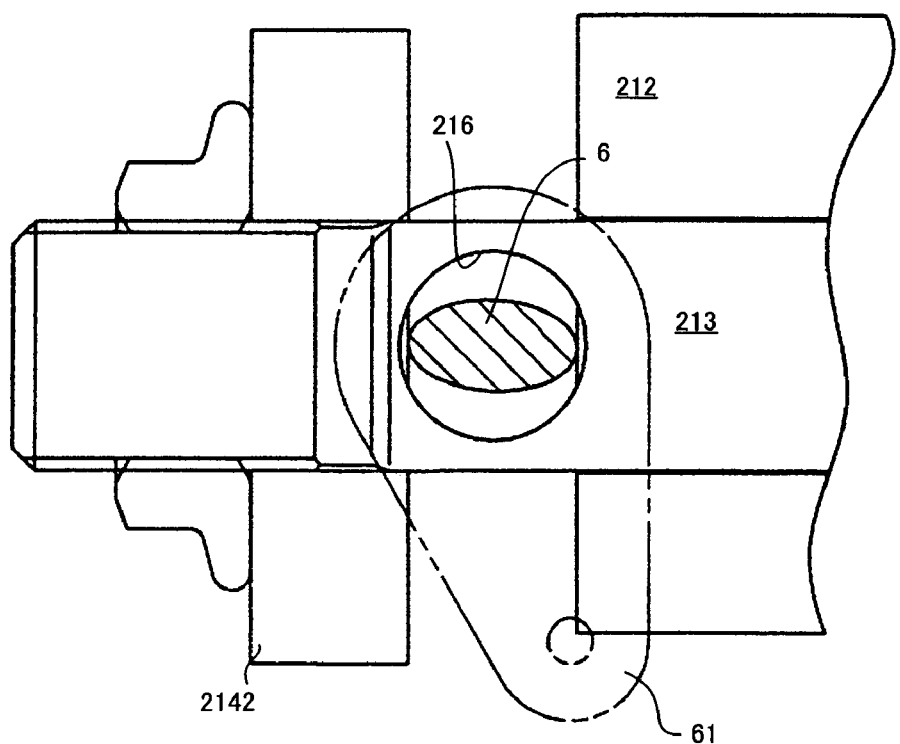
FIG. 24 is an enlarged view of part of FIG. 22, denoting a position to which a column clamp shaft is rotated and clamped.

The column clamp 21 is configured as shown in FIGS. 22 through 24. FIG. 22 shows the C—C cross sectional view of the column clamp shown in FIG. 17 and FIGS. 23 and 24 are enlarged views of part of the column clamp shown in FIG. 22 respectively for denoting positions of the column clamp 6 that is rotating when it is clamped/unclamped. The column clamp 21 is provided at the fixed column member 2 and configured by a first wedge 211, a second wedge 212, a clamp bar 213, and reaction members 2141 and 2412. The fixed column member 2 has a wedge hole 215 drilled horizontally and part of this wedge hole 215 opens to a cavity of the fixed column member 21. Each of the first and second wedges 211 and 212 has its corresponding inclined plane 2111/2112 and housed in the wedge hole 215 so that their sides face to each other. Those inclined planes 2111 and 2112 of the two wedges come to face the outer periphery of the cylindrical part of the moving column member 3.

Each of the first and second wedges 211 and 212 has its corresponding clamp bar hole 2113/2114 and a clamp bar 213 goes through this hole. The reaction members 2141 and 2142 of which diameter is larger than that of the clamp bar holes 2113 and 2114 are fixed to both ends of the clamp bar 213. The clamp bar 213 has a column clamp shaft hole 216 that comes in contact with one reaction member 2142 and a cross sectional part of the clamp shaft 6 goes through this hole. The cross sectional part is actually ellipse in shape.

A rocking arm 61 is fixed at one end of the column clamp shaft 6. The ellipse cross sectional part of the column clamp shaft 6, when unclamped, inclines significantly in the direction of the major diameter as shown in FIG. 23. When clamped, the major diameter of the part faces almost in the axial direction of the clamp bar 213 as shown in FIG. 24. And, because the column clamp 21 is configured as described above, if the rocking arm rotates in the state shown in FIG. 24, the column clamp shaft 6 rotates, thereby the column clamp goes into the state shown in FIG. 24. At this time, one of the near-points of the ellipse major diameter part pushes the reaction member 2142 to the left, thereby the clamp bar 213 is pulled to the left and the reaction member 2141 comes to push the first wedge 211 further to the left. On the other hand, the second wedge 212 is pushed to the right by the other near-point of the ellipse major diameter part.

As a result, the two wedges get close to each other, so that each of the inclined planes 2111 and 2112 pushes the outer periphery of the cylindrical part of the moving column member 3. The moving column member 3 is thus clamped to the fixed column member 2. The first and second wedges 211 and 212 are united into one so as to move slightly to the right/left, so that it never occurs that only one of the wedges pushes strongly the moving column member 3.

If the rocking arm 61 rotates in the opposite direction, the first and second wedges 211 and 212 are separated from each other so that the moving column member 3 is unclamped.

* Operating the Operation Lever *

Next, a description will be made for each member to be moved by the operation lever 7. As shown in FIGS. 9 through 21, the operation lever 7 is provided rockably at the left side of the tilt head 4. At the bottom face of the tilt head 4 are seen the follower lever 714 that rocks by following the operation of the operation lever 7, a pusher plate 73 extended from the follower lever 714 to the left unitarily with the follower lever 714, and a projection 71 formed unitarily with the follower lever 714. The follower lever 714 and the pusher plate 73 are shaped like an inverted L-letter as a whole. At the side face of the tilt head 4 is seen the unclamp keeping mechanism 8. FIGS. 19 and 20 show the whole operation lever 7, as well as two states of how the operation lever 7 is operated with a solid line and a two-dot chain line respectively. The two states mean a case in which the end of the lever 7 is pulled toward the steering wheel 92 and another case in which the end of the lever 7 is pushed (returned) so as to be separated from the steering wheel 92a to adjust the position in the front-rear direction and the tilting angle of the steering wheel 92.

The operation lever 7 is supported rockably by the lever center shaft 72C screwed into the side face of the tilt head 4. And, the rock arm 85 is supported rockably on the lever center shaft 72C. Both of the rock arm 85 and the operation lever 7 are connected to each other through a key (not shown) so that the rock arm 85 and the operation lever 7 rock unitarily around the lever center shaft 72C. An energizing spring 715 is disposed between an engaging projection 716 formed at the operation lever 7 and an engaging projection 411 formed at the tilt head 4 and this energizing spring 715 keeps pushing the operation lever 7 clockwise.

A fork-like engaging recess part 717 is formed at the operation lever 7 and an engaging projection 718 formed at the tip of the follower lever 714 is fit in the engaging recess part 717. Consequently, the follower lever 714 rocks around the lever center shaft 72A in accordance with the operation of the operation lever 7.

In state (a) the operation lever 7 denoted by the two-dot chain line in FIGS. 19 and 20 is not pulled yet. Therefore, the operation lever 7, which is energized by the energizing spring 715, is positioned at the clockwise rocking end. And, the projection 71 of the follower lever 714 is pushed to the left and the tilt head 4 is clamped. If the operation lever 7 is pulled toward the steering wheel 92 when adjusting the tilting angle/the position of the telescopic mechanism, the follower lever 714 rocks clockwise around the lever center shaft 72A. Consequently, if the operation lever 7 rocks to the position (b) denoted by the solid line in FIGS. 19 and 20, the projection 71 united with the follower lever 714 moves to the right, thereby the tilt head clamp 41 is unclamped.

If the operation lever 7 shown in FIG. 19/20 moves from the position (a) denoted by a two-dot line to the position (b) denoted by a solid line, the pusher plate 73 united with the follower lever 714 pushes in the pusher rod 77, thereby the column clamp 21 is unclamped. Consequently, both of the tilt head clamp 41 and the column clamp 21 can be unclamped at the same time only by pulling the single operation lever.

Figure 25:
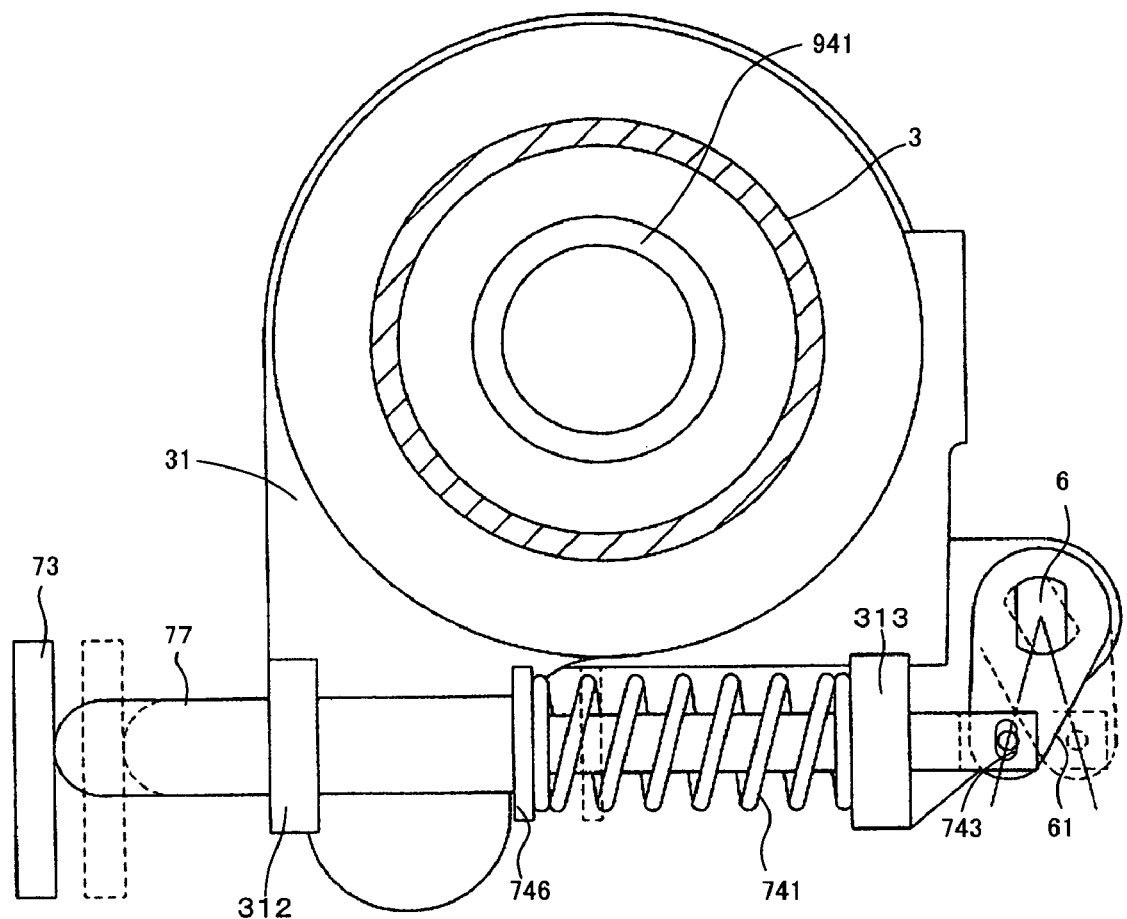
FIG. 25 is a D—D cross sectional view of FIG. 17.

The pusher rod 77 (FIG. 25) is supported by both right and left ribs 312 and 313 of the column head 31 slidably in parallel to the tilt center shaft 43. The pusher rod 77 goes through the energizing spring 741. The spring 741 energizes a flange 746 to the left as shown in FIG. 25. The pusher rod 77 has a long small hole 743 at the right end part at a right angle to the right end part. The right end part of the pusher rod 77 is shaft-engaged with one end of the rocking arm 61 (FIG. 25) through this long hole 743. The long hole 743 absorbs a positional shift from the rocking arm 61 when the pusher rod 74 moves axially.

The spring 741 energizes the pusher rod 77 to the left (FIG. 25). The rocking arm 61 that is to be shaft-engaged with the rod at its right tip is energized to rotate clockwise. The rocking force applied to the rocking arm 61 keeps the clamped position of the column clamp shaft 6 (FIG. 24). (Note that, however, the directions are reversed in FIG. 24 and FIG. 25, so that the right and left positions are inverted) The inverted positions of the rocking arm 61 at those times are denoted by solid lines.

* Unclamp Keeping Mechanism *

Hereunder, a description will be made for both configuration and operation of the unclamp keeping mechanism 8 with reference to FIGS. 18 through 21, as well as FIGS. 26 and 27. The unclamp keeping mechanism 8 in this second embodiment functions for the rocking arm 85 that rocks unitarily with the operation lever 7. While the operation lever 7 is kept pulled toward the steering wheel 92, the unclamp keeping mechanism 8 keeps both of the tilt head clamp 41 and the column clamp 21 in that state respectively.

This unclamp keeping mechanism 8 is provided at the left side of the tilt head 4 on a shaft together with the tilt center shaft 43. The tilt center shaft 43 provided at the left side of the tilt head 4 has a small diameter shaft part 431 protruded from the tilt head 4 and a locking cam 86 is shaft-supported rockably by this small diameter shaft part 431. On the left side face of the tilt head 4 is formed a projection 412 so as to be protruded to the left side of the tilt center shaft 43. The tip of the small diameter shaft part 431 is shaft-supported at a support plate 87 fastened to this projection 412 with screws.

The rocking cam 86 keeps receiving a counterclockwise rotation force from a torsional spring 88 disposed between the rocking cam 86 and the support plate 87. A stopper projection 861 (FIG. 26) is formed at the rocking cam and this stopper projection 861 comes in contact with a stopper plane 413 formed on top of the projection 412 (FIGS. 26(1) and (7)), thereby the counterclockwise rocking end of the rocking cam 86 is limited. The small diameter shaft part 431 has a through-hole 862 (FIGS. 27(1) and (2)) in which the small diameter shaft 431 is inserted loosely. At both sides of this through-hole 862 is formed a large rounded part. Consequently, the rocking cam 86 is structured so as to incline to the flat face orthogonally to the center shaft of the small diameter shaft part 431 as shown in FIG. 27(2).

Figure 26:
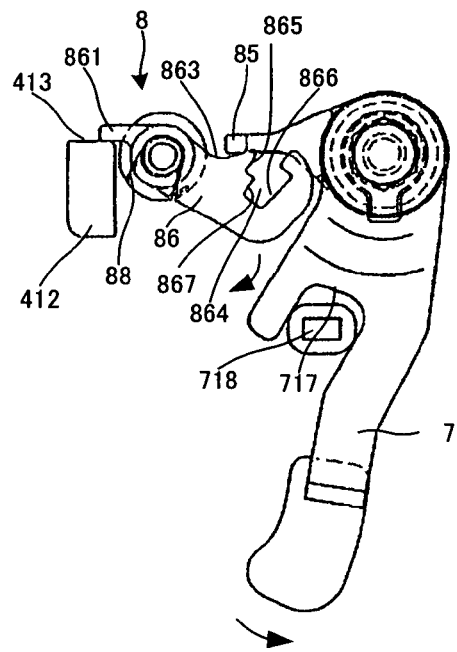
FIG. 26(1) is an illustration for describing the operation of an unclamp keeping mechanism 8 in the second embodiment of the present invention.
Figure 26:
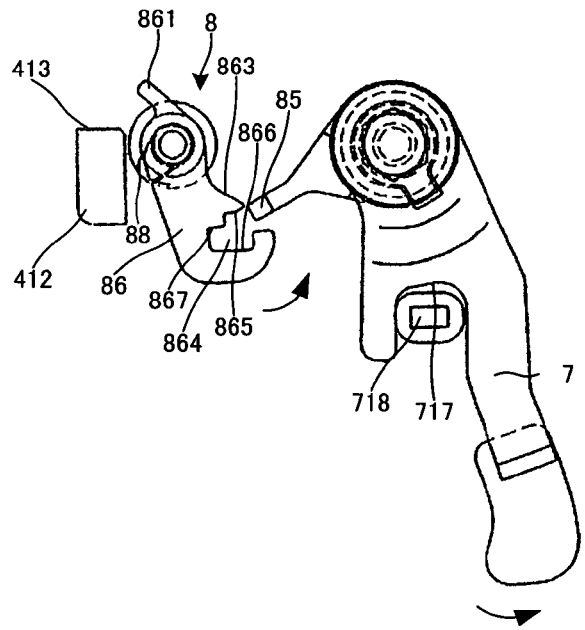
Figure 26:
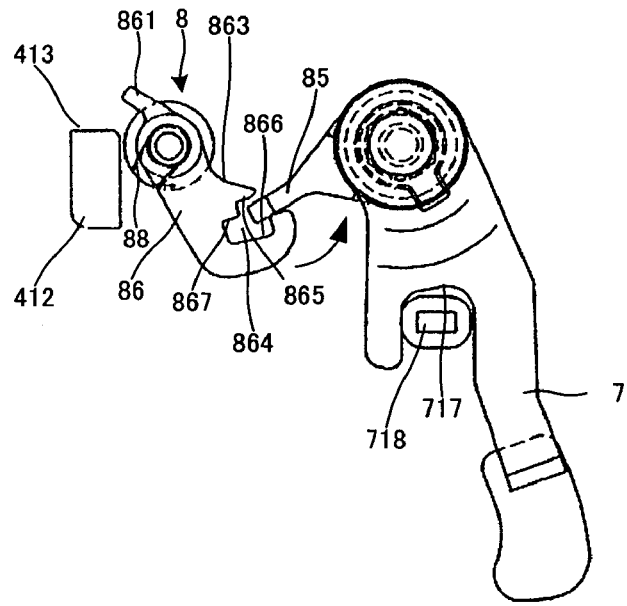
Figure 26:
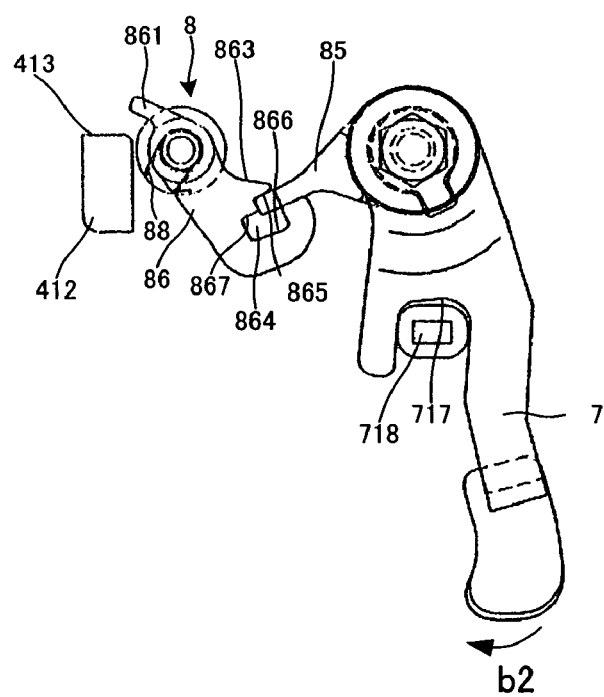
Figure 26:
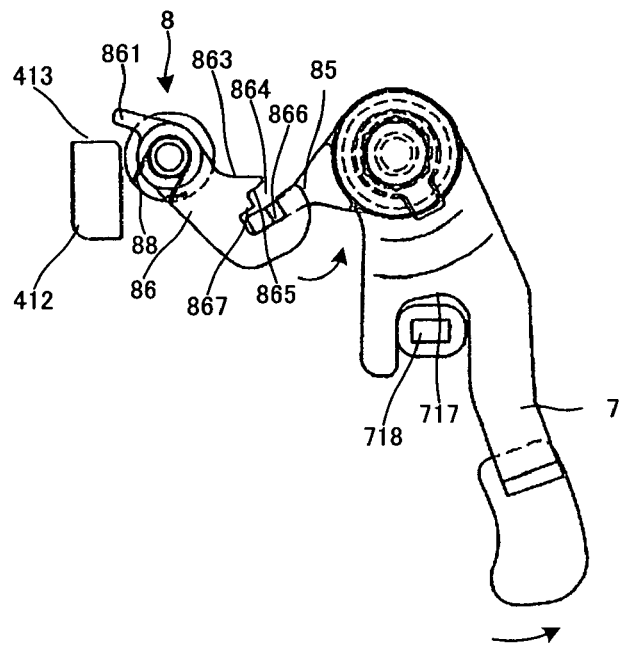
Figure 26:
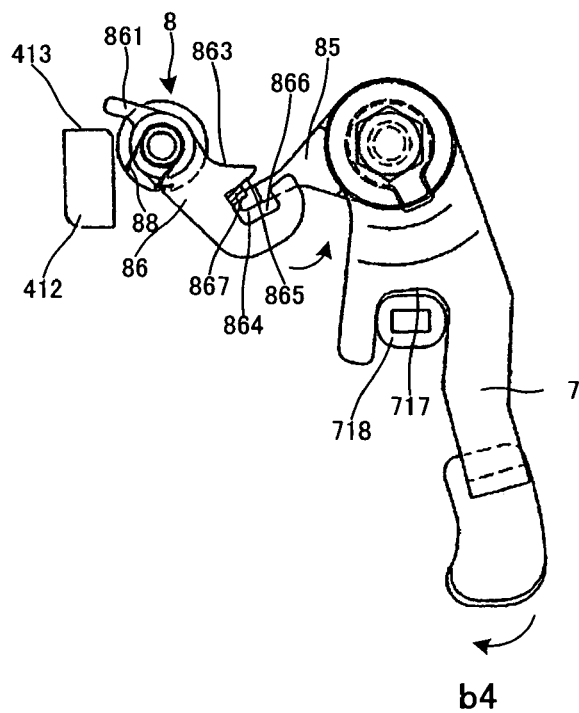
Figure 26:
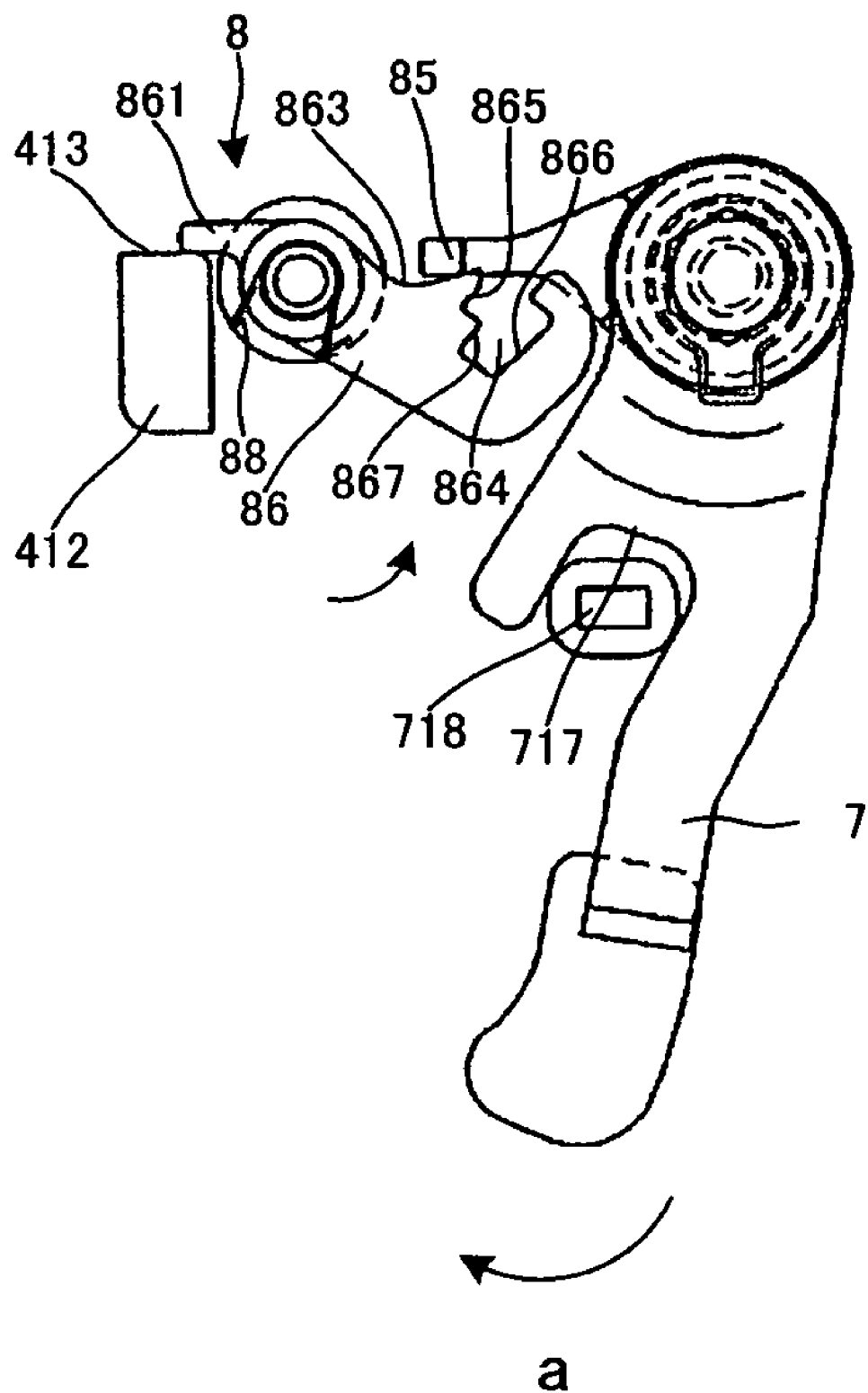
Figure 27:
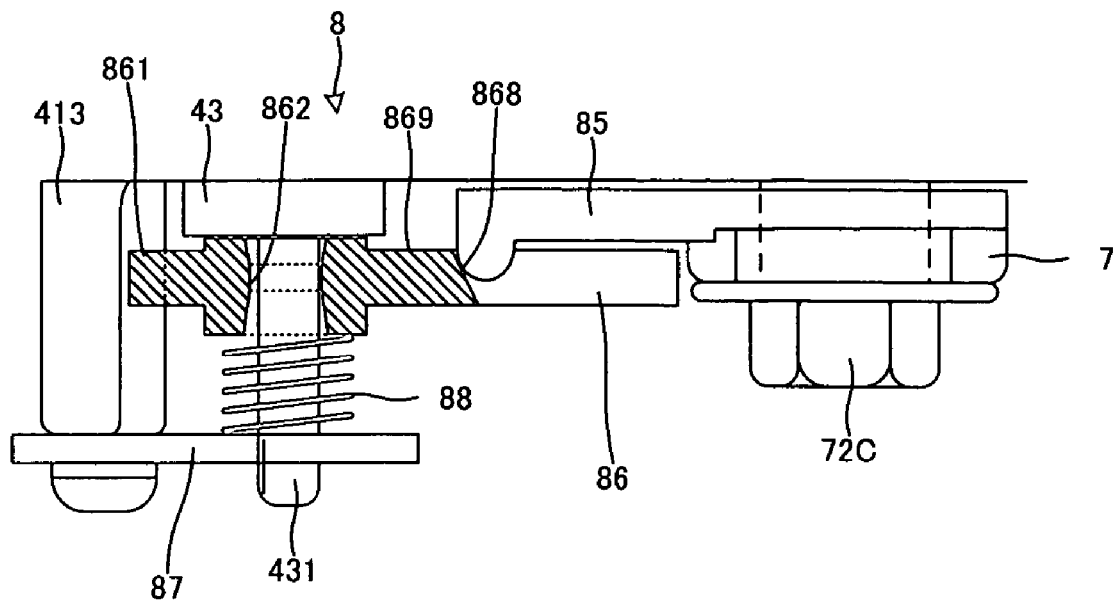
FIGS. 27(1) and (2) are illustrations for describing the operation of the unclamp keeping mechanism in the second embodiment of the present invention, corresponding to top views of FIGS. 2(5) and (6) respectively.
Figure 27:
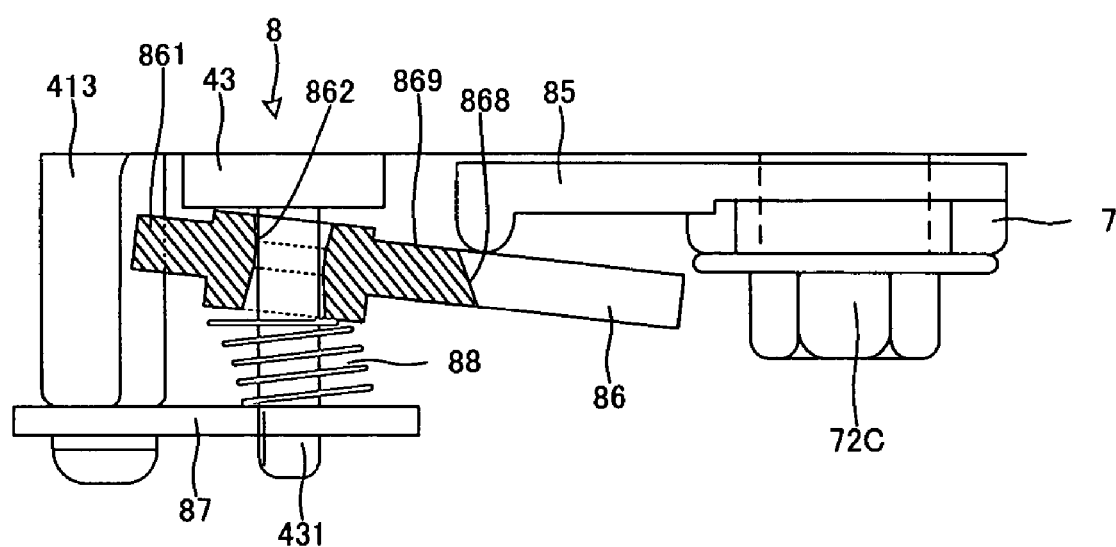

FIGS. 26(1) through (7) show how the rocking arm 85 and the rocking cam 86 are engaged with each other according to an operation of the operation lever 7, as well as how the unclamp keeping mechanism 8 acts with respect to the engagement. FIG. 26(1) shows a positional relationship between the rocking arm 85 and the rocking cam 86 when the operation lever 7 is in the state a, that is, when the operation lever 7 is not pulled yet. In this state, the operation lever 7 is pushed clockwise by the energizing spring 715 and the rocking cam 86, pushed by the torsional spring 88, stops while its stopper projection 861 is in contact with the stopper plane 413. At this time, the projection 71 of the follower lever 714 is pushed to the left (FIG. 71), thereby the tilt head clamp 41 is clamped. The pusher plate 73 united with the follower lever 714 is positioned as denoted by a two-dot chain line in FIG. 20, so that the column clamp 21 is also clamped.

If the operation lever 7 is pulled toward the steering wheel 92 (counterclockwise rocking in FIG. 26(1), the tip of the rocking arm 85 that rocks unitarily with the operation lever 7 pushes down the side face 863 of the rocking cam 86, so that the rocking cam 86 rocks clockwise against the energizing force of the torsional spring 88.

As shown in FIG. 26(2), if the operation lever 7 is pulled up to the position b1, the tip of the rocking arm 85 is separated from the side face 863 of the rocking cam 86, so that the rocking cam 86 begins rocking counter clockwise due to the energizing force of the torsional spring 88.

If the driver releases his/her hand off from the operation lever 7 as shown in FIG. 26(3), the tip of the rocking arm 85 goes into the groove 864 of the rocking cam 86. The operation lever 7 then rocks slightly clockwise due to the energizing force of the energizing spring 715 and the rocking cam 86 rocks slightly counterclockwise due to the energizing force of the torsional spring 88. As a result, as shown in FIG. 26(4), the tip of the rocking arm 85 comes in contact with the inlet side top face 865 of the groove 864 of the rocking arm 86. Consequently, the rocking cam 86 and the rocking arm 85 cross each other in the rocking locus, so that the rocking cam 86 and the rocking arm 85 cannot rock any longer, thereby they 86 and 85 stop their rocking.

As a result, even when the driver takes his/her hand off the operation lever 7, the operation lever 7 stops continuously at the position b2 in FIG. 26(4), thereby both of the tilt head clamp 41 and the column clamp 21 are kept unclamped. The driver can thus adjust the position in the front-rear direction and the tilting angle of the steering wheel 92 easily by holding the steering wheel with both hands.

After completing the adjustments for both of the position in the front-rear direction and the tilting angle of the steering wheel, the driver takes his/her one hand off the steering wheel 92 and pulls the operation lever 7 again with the free hand up to a position b3 toward the steering wheel 92. Then, the tip of the rocking arm 85 is separated from the inlet side top face 865 of the groove 864 of the rocking cam 86, so that the rocking cam 86 begins rocking slightly counterclockwise and the tip of the rocking arm 85 comes in contact with the inmost bottom face 866 of the groove 864. FIG. 26(5) shows the state at that time and FIG. 27(1) shows a top view of FIG. 26(5).

If the driver takes his/her hand off the operation lever 7, the operation lever 7 rocks up to the position b4 clockwise due to the energizing force of the energizing spring 715 and the rocking cam 86 rocks counterclockwise due to the energizing force of the torsional spring 88. As a result, as shown in FIG. 26(6), the tip of the rocking arm 85 comes in contact with the inmost top face 867 of the groove 864 of the rocking cam 86. And, because an inclined plane 868 (FIGS. 27(1) and (2)) is formed at the back 869 of the inmost top face 867, the tip of the rocking arm 85 goes into the inclined plane 868 to incline the rocking cam 86. FIG. 27(2) shows a top view of the situation The rocking arm 85 thus rocks clockwise through the back 869 from the inclined plane 868 of the rocking cam 86, then passes the rocking cam 86 and the operation lever 7 stops at the same position a as that shown in FIG. 26(1). The rocking cam 86 stops when the engaging projection 861 comes in contact with the stopper plane 413. FIG. 26(7) shows that state. The state shown in FIG. 26(7) is the same as that shown in FIG. 26(1) in which the tilt head clamp 41 and the column clamp 21 are clamped again. They are kept clamped even after the driver takes his/her hand off the operation lever 7.

\* Adjustment of the Steering Wheel

Hereunder, a description will be made for how to operate the operation lever 7 to adjust the position in the front-rear direction and the tilting angle of the steering wheel in the second embodiment, as well as how each member acts in such adjustments of the position in the front-rear direction and the tilting angle of the steering wheel 92.

\*\* Adjustment of Tilting Angle and Front-Rear Direction (Length of the Steering Column Apparatus)

The driver takes his/her hand off the steering wheel 92 and pull the operation lever 7 with the free hand toward himself/herself (from position a to position b) (FIG. 19) when adjusting the tilting angle/position in the front-rear direction of the steering wheel 92. The operation lever 7 thus rocks the follower lever 714 around the center shaft 72A of the lever 7 as shown in FIG. 20.

When the follower lever 714 rocks such way, the projection 71 moves to the right as shown in FIG. 17 and the gear arm 44 rotates counterclockwise due to its own weight. The rotation of the gear arm 44 disengages the teeth of the segment gear 33 from the gear part 442 of the gear arm 44, thereby the tilt head 4 can be adjusted for tilting angle (FIG. 20). On the other hand, the pusher plate 73 rocks up to a position denoted by a solid line in FIG. 20 to resist the energizing force of the energizing spring 741 to push the pusher rod 77 to the right, that is, a point denoted by a dotted line in FIG. 25.

The movement of the pusher rod 77 to the right causes the column clamp shaft 6 to rotate counterclockwise. And, according to the rotation of the column clamp shaft 6, the major diameter part of the column clamp shaft, which has been horizontal as shown in FIG. 24, comes to incline as shown in FIG. 23. As a result, the first and second wedges 211 and 212 that have been close to each other as shown in FIG. 22 are separated, thereby the moving column member 3 is unclamped.

As shown in FIG. 26(1) to (4), the unclamp keeping mechanism 8 functions to keep the operation lever 7 positioned at b2 shown in FIG. 26(4). Consequently, the driver can take his/her hand off the operation lever 7 to hold the steering wheel 92 with both hands and adjust the position in the front-rear direction and the tilting angle of the steering wheel easily.

After completing the above adjustments of the steering wheel 92, the driver takes his/her one hand off the steering wheel 92 and pull the operation lever 7 again toward himself/herself with the disengaged hand. The unclamp keeping mechanism 8 then functions as shown in FIG. 26(5) to (7) and the operation lever 7 returns to the position a denoted by a two-dot chain line in FIG. 19/20.

Consequently, the operation lever 7, as shown in FIG. 20, rocks the follower lever 714 counterclockwise around the center shaft 72A of the lever 7, thereby the projection 71 moves to the left as shown in FIG. 17, the segment gear 33 is engaged with the gear part 442 of the gear arm 44, and the tilt head 4 is clamped to the column head 31. At the same time, the pusher plate 73 rocks up to a position denoted by a two-dot chain line shown in FIG. 20, thereby the pusher rod 77 returns to the left, that is, a position denoted by a solid line in FIG. 25 due to the energizing force of the energizing spring 741.

The movement of the pusher rod 77 to the left as described above causes the rocking arm 61 to rock, thereby the column clamp shaft 6 rotates clockwise. And, according to the rotation of the column clamp shaft 6, the major diameter part of the column clamp shaft 6, which has inclined as shown in FIG. 23, becomes almost horizontal as shown in FIG. 24. As a result, the first and second wedges 211 and 212 get close to each other, thereby the moving column member 3 is clamped. On the other hand, the unclamp keeping mechanism 8 keeps the operation lever 7 positioned at the clockwise rocking end as shown in FIG. 26(1) and (7), so that the column clamp 21 and the tilt head clamp 41 are kept clamped respectively.

If the tilt head clamp 41 is unclamped, the tilt head 4 is forced to face down due to its own weight. This is why the tilt head 4 is provided with a counter-balance strong spring 45 (FIG. 17, FIG. 20). This spring 45 cancels the downward force applied to the tilt head 4. The tilt head 4 may also be provided with another force to keep the steering wheel 92 at the top tilting position and make it easier for the driver to get in/out of the car.

According to the second embodiment described above, therefore, the single operation lever provided apart from the steering wheel can be used to clamp/unclamp both of the telescopic mechanism and the tilting mechanism simultaneously. In addition, when the telescopic mechanism and the tilting mechanism are unclamped, both of the mechanisms are kept in that state even after the driver takes his hand off the operation lever. Therefore, the driver can use both hands to adjust the position in the front-rear direction and the tilting angle of the steering wheel. This makes it easier to do such adjustments.

Furthermore, both of the telescopic mechanism and the tilting mechanism can be unclamped by the first pulling operation of the single operation lever, then both of the telescopic mechanism and the tilting mechanism can be clamped by the next pulling operation of the operation lever. The operation of the operation lever is such simple and easy for the driver. It is also possible to define the first pushing of the operation lever for unclamping both of the telescopic mechanism and the tilting mechanism and the next pushing for clamping of both of the telescopic mechanism and the tilting mechanism.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A steering column apparatus, comprising:
   a wheel shaft for transmitting the rotation from a steering wheel to a steering mechanism of a car body;
   a telescopic mechanism for adjusting the position of said steering wheel in the front-rear direction of said car body;
   a tilting mechanism for adjusting the tilting angle of said steering wheel;
   a clamping mechanisms for clamping said telescopic mechanism and said tilting mechanism respectively;
   a single operation lever with an end apart from said steering wheel for a driver to operate said clamping mechanisms; and
   an unclamp keeping mechanism which keeps at least one of said clamping mechanisms in unclamping state for steering wheel adjustment after the first operation is applied to said lever until the second operation is applied thereto.

2. A steering column apparatus according to claim 1:
   wherein said tilting mechanism and said telescopic mechanism are unclamped by operations in different directions of said lever.

3. A steering column apparatus according to claims 1:
   wherein both of said tilting mechanism and said telescopic mechanism are unclamped at the same time when said operation lever is operated.

4. A steering column apparatus, comprising:
   a wheel shaft for transmitting the rotation from a steering wheel to a steering mechanism of a car body;
   a telescopic mechanism for adjusting the position of said steering wheel in the front-rear direction of said car body;
   a tilting mechanism for adjusting the tilting angle of said steering wheel;
   clamping mechanisms for clamping said telescopic mechanism and said tilting mechanism;
   an operation lever with an end apart from said steering wheel for a driver to operate said clamping mechanisms; and
   an unclamp keeping mechanism which keeps said clamping mechanism of said telescopic mechanism in unclamping state for steering wheel adjustment after the first operation is applied to said lever until the second operation is applied thereto.

5. A steering column apparatus, comprising:
   a wheel shaft for transmitting the rotation from a steering wheel to a steering mechanism of a car body;
   a telescopic mechanism for adjusting the position of said steering wheel in the front-rear direction of said car body;
   a tilting mechanism for adjusting the tilting angle of said steering wheel;
   clamping mechanisms for clamping said telescopic mechanism and said tilting mechanism;
   an operation lever with an end apart from said steering wheel for a driver to operate said clamping mechanisms; and
   an unclamp keeping mechanism which keeps said clamping mechanism of said tilting mechanism in unclamping state for steering wheel adjustment after the first operation is applied to said lever until the second operation is applied thereto.

6. A steering column apparatus, comprising:
a first column member having a mounting part for mounting itself to a car body;
a second column member supported by said first column member unrotatably and movably along the longitudinal direction;
a column head provided at one end of said second column member;
a tilt head tiltably supported by said column head;
a wheel shaft rotatably supported by said tilt head for fixing a steering wheel at its end;
a column clamp for clamping said second column member to said first column member;
a clamp lever having a first rocking axis on said tilt head;
a tilt head clamp for clamping said tilt head to said column head correlatively to the rocking of said clamp lever;
a single operation lever supported by said clamp lever rockably around a second rocking axis and having an end apart from said steering wheel; and
an unclamp keeping mechanism which keeps said clamping mechanisms in unclamping state for steering wheel adjustment after the first operation is applied to said operation lever until the second operation is applied thereto;
wherein said tilt head is unclamped by rocking of said clamp lever around the first rocking axis on said tilt head caused by operation of said operation lever in one direction and said second column member is unclamped by rocking of said operation lever around the second rocking axis on said clamp lever in the opposite direction.

7. A steering column apparatus according to claim 6;
wherein said unclamp keeping mechanism includes:
a pusher plate with which said operation lever provides;
a guide fixed to said column head;
a pusher, one end of which is put in contact with said pusher plate, being slidable in parallel to tilting axis of said tilt head under the guidance of said guide; and
a shifter being slidable in parallel to said tilting axis when coming in contact with the other end of said pusher under the guidance of said guide;
whereby said opposite directional rocking motion of said operation lever is converted to rocking motion of said pusher plate, to liner motion of said pusher, to liner motion of said shifter for clamping/unclamping of said second column and to rotation of the same guided by inclined plate of said guide for keeping the clamping/unclamping state.

8. A steering column apparatus according to claim 7,
wherein said unclamp keeping mechanism further includes:
a rod with ends, one end of which being in contact with said shifter and the other engaging with said column clamp, supported by said column head slidably and co-axially to said shifter; and
a first spring biasing said rod to said shifter for clamping said second column and keeping in contact with said shifter.

9. A steering column apparatus according to claim 8,
wherein said tilt head is provided with a second spring biasing said clamp lever for clamping.

10. A steering column apparatus according to claim 9,
wherein said unclamp keeping mechanism is released from unclamping state of by second operation of said operation lever.

11. A steering column apparatus, comprising:
a first column member having a mounting part for mounting itself to a car body;
a second column member supported by said first column member unrotatably and movably along the longitudinal direction;
a column head provided at one end of said second column member;
a tilt head tiltably supported by said column head;
a wheel shaft rotatably supported by said tilt head for fixing a steering wheel at its end;
a column clamp for clamping said second column member to said first column member;
a tilt head clamp for clamping said tilt head to said column head;
a single operation lever with an end apart from said steering wheel supported rockably by said tilt head for operating both of said column clamp and said tilt head clamp; and
an unclamp keeping mechanism which keeps said clamping mechanisms for both of said second column and said tilt head in unclamping state for steering wheel adjustment after the first operation is applied to said operation lever until the second operation is applied thereto.

12. A steering column apparatus according to claim 11,
wherein said clamp keeping mechanism includes a rocking arm and a rocking cam;
wherein said rocking arm is provided at said operation lever and capable of coming in contact with one end of said rocking cam;
wherein said rocking cam is supported at said tilt head rockably; and
wherein rocking of said operation lever, when said lever is rocked in one direction, is converted to rocking of said rocking arm and rocking of said rocking cam in order and, when both of said column clamp and said tilt head clamp are unclamped, said rocking arm is engaged with said rocking cam, thereby keeping both of said column clamp and said tilt head clamp in that state.

13. A steering column apparatus according to claim 12,
wherein said unclamp keeping mechanism further includes a first spring; and
wherein said first spring biases said rocking cam so as to keep it in contact with said rocking arm.

14. A steering column apparatus according to claim 13;
wherein said tilt head is provided with a second spring for biasing said operation lever for tilt head clamping.

15. A steering column apparatus according to claim 14,
wherein said unclamp keeping mechanism are released from unclamping state by operation of said operation lever in one direction.

16. A steering column apparatus, comprising:
a wheel shaft for transmitting the rotation from a steering wheel to a steering mechanism of a car body;
a adjusting mechanism for adjusting the position of said steering wheel;
a clamp mechanism for clamping said adjusting mechanism;
an operation lever with an end apart from said steering wheel for operating said clamp mechanism; and
an unclamp keeping mechanism which keeps said clamping mechanism in unclamping state for steering wheel adjustment after the first operation is applied to said lever until the second operation is applied thereto.

* * * * *